US006705872B2

(12) United States Patent
Pearson et al.

(10) Patent No.: US 6,705,872 B2
(45) Date of Patent: Mar. 16, 2004

(54) METHOD AND SYSTEM FOR CREATING AND MAINTAINING ASSESSMENTS

(76) Inventors: Michael Vincent Pearson, 40 Fawn La., Kennett Square, PA (US) 19348; Paul Francis Christ, 615 Juniper Dr., Blue Bell, PA (US) 19422

( * ) Notice: Subject to any disclaimer, the term of this patent is extended or adjusted under 35 U.S.C. 154(b) by 6 days.

(21) Appl. No.: 10/096,613

(22) Filed: Mar. 13, 2002

(65) Prior Publication Data
US 2003/0175675 A1 Sep. 18, 2003

(51) Int. Cl.[7] .................................................. G09B 7/00
(52) U.S. Cl. ........................ 434/322; 434/323; 434/362
(58) Field of Search ................................. 434/322, 323, 434/362; 345/731

(56) References Cited

U.S. PATENT DOCUMENTS

| | | | |
|---|---|---|---|
| 5,287,489 A | | 2/1994 | Nimmo et al. |
| 5,658,161 A | | 8/1997 | Roberts et al. |
| 5,782,692 A | * | 7/1998 | Stelovsky ........................ 463/1 |
| 5,842,871 A | | 12/1998 | Cutler et al. |
| 5,879,165 A | | 3/1999 | Brunkow et al. |
| 5,890,911 A | * | 4/1999 | Griswold et al. ............ 434/322 |
| 6,018,617 A | * | 1/2000 | Sweitzer et al. ............ 358/1.15 |
| 6,099,320 A | | 8/2000 | Papadopoulos |
| 6,146,148 A | | 11/2000 | Stuppy |
| 6,162,060 A | | 12/2000 | Richard et al. |
| 6,164,974 A | * | 12/2000 | Carlile et al. ................ 434/322 |
| 6,259,890 B1 | | 7/2001 | Driscoll et al. |
| 6,267,601 B1 | | 7/2001 | Jongsma et al. |
| 6,315,572 B1 | * | 11/2001 | Owens et al. ................ 434/322 |
| 6,347,943 B1 | * | 2/2002 | Fields et al. ................. 434/118 |
| 6,527,556 B1 | * | 3/2003 | Koskinen ..................... 434/219 |
| 2002/0061506 A1 | * | 5/2002 | Catten et al. ................ 434/369 |
| 2003/0044761 A1 | * | 3/2003 | Houlihan et al. ........... 434/350 |

* cited by examiner

Primary Examiner—John Edmund Rovnak

(57) ABSTRACT

A method and system for creating and maintaining assessments involving using an interface device, connected to an electronic and/or communications channel(s), to access an assessment control system in order to identify information related to information content and develop assessment items. User activity within an interface device occurs within an environment in which multiple components are present in a manner that produces a continuous unified perceptual experience. Thus users can create and maintain assessment information while in the presence of the information content, which most likely represents, either directly or indirectly, the material or subject for which an assessment is being created. User activities within one component do not material affect or disturb information in other components unless the user intentionally chooses to alter other components. Maintenance to the information related to information content and to the assessment items also occur within the continuous unified perceptual experience.

41 Claims, 12 Drawing Sheets

METHOD AND SYSTEM FOR CREATING AND MAINTAINING ASSESSMENTS

BACKGROUND-FIELD OF INVENTION

This invention generally relates to field of assessment, and more particularly, to a method and system that facilitate the creation and maintenance of assessments.

BACKGROUND-DESCRIPTION OF PRIOR ART

There are many situations that require one party to use some method of assessment to gather information on another party. In this context, assessments are means and methods used to evaluate, test, measure and/or other means used by one party to gain insight into another party's understanding, knowledge, comprehension, progress, skill development, memory and other criteria.

The most common example of this is when a teacher must assess the knowledge that has been absorbed by students. In addition to an academic environment, there are many other situations in which assessment may be used. Some examples may include: a company training its workers on how to use a new technology product; a market research firm asking respondents to a survey to evaluate a new packaging design; or an insurance company determining whether a potential policy holder has read and understands the policy for which they are seeking coverage. These are just a few of many ways in which information assessment may be used.

Until the advent of computer technology, most assessment was limited to using either verbal or handwritten means to gather the information provided by the assessment. For example, in the classroom setting the teacher might ask questions and seek verbal responses or the teacher may use a print format by administering tests or quizzes. However, with improvements in computer technology and, in particular, the advent of computer networks such as the Internet and corporate Intranets, assessments can now be carried out in electronic form. For example, students can take a course over the Internet without the need to be in the classroom and can take tests, quizzes and other assessments by using a computer to access courseware; or a consumer can be recruited by an advertising agency to view and evaluate advertisements that are sent to their interactive television; or a trade show operator can send questionnaires regarding the effectiveness of the show, which are accessible by exhibitors or show attendees via their wireless devices.

The process for creating assessments that are electronically delivered has generally followed a method that consists of the following steps. The person creating the assessment reviews material (e.g., reading material, presentation material, web sites, etc.) for which an assessment is required. During or after the review the person creating the assessment determines what form (e.g., multiple choice questions, essay, attitude/opinion measurement, etc.) the assessment will take. The person creating the assessment then creates the assessment using an electronic creation tool (e.g., educational courseware, HTML form, word processing document, etc). Once created the person creating the assessment reviews and alters the assessment as needed. The assessment is then made available electronically (e.g., transferring file, submitting through courseware, electronically mailing, etc.). Finally the person being assessed accesses and completes the assessment.

An inherent drawback for users who create and maintain assessments for electronic delivery rests in the fact that current methods require the user to alternate between the source(s) of information from which the assessment will be drawn and the electronic tools used to develop the assessment. That is, the information content from which the assessment will be drawn and the assessment development tools are not within a continuous unified perceptual experience.

A continuous unified perceptual experience exists when one or more sensory inputs or stimuli are present, either concurrently or in relevant sequential order, so that the user's overall sensory experience or awareness registers as a single or series of associated and undisturbed events. For the purpose of this invention such an experience takes place within the experience obtained when interacting, either passively or actively, with certain electronic or communications devices. The main principle behind the continuous unified perceptual experience is that the person who is registering the experience when interacting with the electronic and/or communications device is perceiving that the stimuli they are experiencing are linked or unified in a logical or rational manner such as being associated with a specific item or application and/or emanating from a single source. A disruption to the link that establishes the perceived connection of stimuli results in a disruption to the person's perceptual experience. A distinction is not made based on length of time of exposure to the stimuli but on common characteristics that link the stimuli and that these links are relevant within the context of the person's current expectations of the perceptual experience.

For the purpose of this invention, examples may include: information provided through a single computer application such as a single web browser; programming provided through a single analog or digital wireline broadcast source such as cable sources and programming provided through a single analog or digital wireless broadcast source such over-the-air television and radio, satellite, and other wireless applications. In each of these examples someone whose current perceptual experience is focused on the information (i.e., stimuli) provided by these sources recognizes that these are linked as long as the delivery of the stimuli remains undisturbed within the user's expectations of the perceptual experience.

For example, when watching television the viewer may become absorbed with programming offered by a broadcast channel, which contains many sensory stimuli most notably text, video and audio, which the viewer realizes are integrated to produce the programming content. For the viewer the combination of different sensory stimuli offered by the broadcaster produces a unified event. However, if the broadcast channel is changed, then a viewer's perceptual experience has been altered and the viewer's awareness has to some degree shifted away from the programming offered by the previously viewed broadcast channel.

Likewise, when working with programs or applications through a computer interface device, a user's experience is often interrupted by the need to switch between programs or applications in order to complete a task. The switching presents the user with new sensor stimuli either fully or partially in place of the perceptual experience they were sensing before the switching occurred. For example, a user may need to switch from one program or application to another, which may create a situation whereby the program or application the user was working with is now overlaid, either fully or partially, with another program or application. These interruptions in one's perceptual experience may present problems to the user of the interface device as they make certain adjustments to handle the shift in their awareness.

A drawback of existing methods for creating and maintaining assessments is that these require the user to work with information content and the assessment creation tools that represent separate sensory experiences. The user is required, in nearly all situations, to make physical and/or mental adjustments or manipulations that at one point in time brings the information content within their sensory experience and another adjustment or manipulation to bring the assessment creation tools into their sensory experience. The act of bringing one of these items into the user's perceptual experience requires that the other item depart the user's perceptual experience either in part or in full.

For example, a teacher may instruct students to visit a number of web sites as part of a class assignment. The teacher would like to create a means to assess the level of knowledge or experience (or measure some other attribute) gained by the student after visiting the sites. To do so the teacher uses online courseware, which contains an assessment module in which the teacher can create response items that assess the students' knowledge/experience of the assigned web sites. To create this assessment the teacher must first visit the web site. Once the site has been visited, the teacher can begin to develop the response items to be included in the assessment. To create response items related to the material found on the web sites, the teacher has the ability to draw from several sources. One source is to tap into his/her memory of what he/she experienced when visiting the web sites. A second source is to look at a printed form of the web site, which the teacher may have produced when she/he visited the site. A third source is for the teacher to retain the web site for viewing on a computer screen (e.g., in a browser).

Yet each of the sources from which the teacher can refer holds certain disadvantages to the user when creating the assessment. A disadvantage of relying on memory, is that the teacher does not have the actual information content in their view and must rely solely on her or his memory of the material on the web site in order to create the response items. A failure to remember may require the teacher to go back to the material by revisiting the web site. This may result in extra time being spent in creating the assessment. Additionally, if the user's memory is in error the user may enter the wrong information on the assessment that could lead to problems at some time during or after the assessment is to be completed by the students.

Disadvantages also exist when the teacher is referring to the printed representation of the web site. For instance, the teacher faces the inconvenience of moving his or her eyes away from the assessment creation tools in order to refer back to the printed document. This process has several drawbacks. First, it may potentially increase the time it takes to develop the assessment since the user must move their eyes away from the electronic assessment development tool in order to focus on the printed material. Second, this method may increase the risk of errors in terms of data entry within the electronic assessment creation tools especially if the user must remove their hands from the interface device in order to handle or manipulate the printed material. Third, this method is clearly expensive in terms of paper and materials since the teacher must printout the web site. Fourth, if the teacher produced the printout some time in the past, it is a possibility that the contents of the actual web site may have changed between the time it was printed out and the time the teacher referred to it in order to develop the assessment. This may result in the assessment being unsuitable or inaccurate compared to the information that now appears on the web site.

Disadvantage also exists with the option of switching between the web browser that contains the web site that serves as the information content and computer application containing the assessment creation tools. First, the act of switching between the two items may mean that one item is lost from view either fully or partially. This can increase the time it takes to develop the assessment since the user may need to continually switch between the two items. Second, while it is conceivable that the user could manipulate both items so as to make them appear in a way so one item does not overlap or block the other, the act of doing so is time consuming, inconvenient and, for many users, technically challenging. Additionally, this does not qualify as a unified perceptual experience since the items reside in separate applications rather than within a single application.

While a number of previous inventions have dealt with other issues related to one or more aspects of assessments such as delivery using electronic methods (U.S. Pat. No. 6,146,148), group methods for creating assessment (U.S. Pat. No. 6,259,890), scoring or grading (U.S. Pat. No. 6,267,601) or authoring within courseware (U.S. Pat. No. 6,162,060), prior art is lacking in addressing the issues raised in this invention.

The object of the present invention then is to create a method and system utilizing electronic and/or communications channels that allows users to create and maintain assessments, while in the presence of certain information content, in a way that provides a continuous unified perceptual experience.

Other objects and features of the invention and the manner in which the invention achieves its purpose will be appreciated from the foregoing and the following description and the accompanying drawings, which exemplify the invention.

SUMMARY OF THE INVENTION

The present invention provides a method and system that allows a user to create and maintain assessments. The assessments are primarily developed by one party for the purpose of assessing another party, such as a teacher preparing an assessment for a student. However, the present invention can be used in other situations where the purpose is for one party to gain insight into another party's understanding, knowledge, comprehension, progress, skill development, memory and other criteria.

In the preferred embodiment a user will gain access, through an interface device, to an assessment control system that includes tools for creating and maintaining assessments. An aspect of this invention is that a user must identify information related to information content, which most likely represents, either directly or indirectly, the material or subject for which an assessment is being created. This information includes identifying the electronic and/or communications channel(s) location(s) of the information content. Once information content is identified the user can develop the assessment.

In this invention, the user develops assessments within an interface device operated by the user. In the preferred embodiment the assessment control system manages delivery to the user's interface device of multiple components. For identifying information content, the system manages the concurrent delivery of a component containing tools to allow the user to identify information content and a component containing the information content. For creating the actual assessment the system manages the concurrent delivery of a component containing tools to allow the user to develop the assessment and a component containing the information content.

The manner in which the system manages the delivery of multiple components to the user's interface device is in a form that produces a continuous unified perceptual experience. A continuous unified perceptual experience exists when one or more sensory inputs or stimuli are present, either concurrently or in a sequential order, so that the user's overall experience or awareness registers as a single or series of associated and undisturbed events.

An additional feature of this invention is to allow for maintenance of previously created assessments, which includes additions, deletions, and other adjustments. Maintenance can occur on the actual assessment and on information related to the information content. Another feature of this invention is that new assessments can be created using information used in previous assessments. An additional feature of this invention is that the user's interface device is connected to an electronic and/or communications channel(s).

DETAIL DESCRIPTION OF THE PREFERRED EMBODIMENT

Explanation of Assessment Control System

Figure 1:
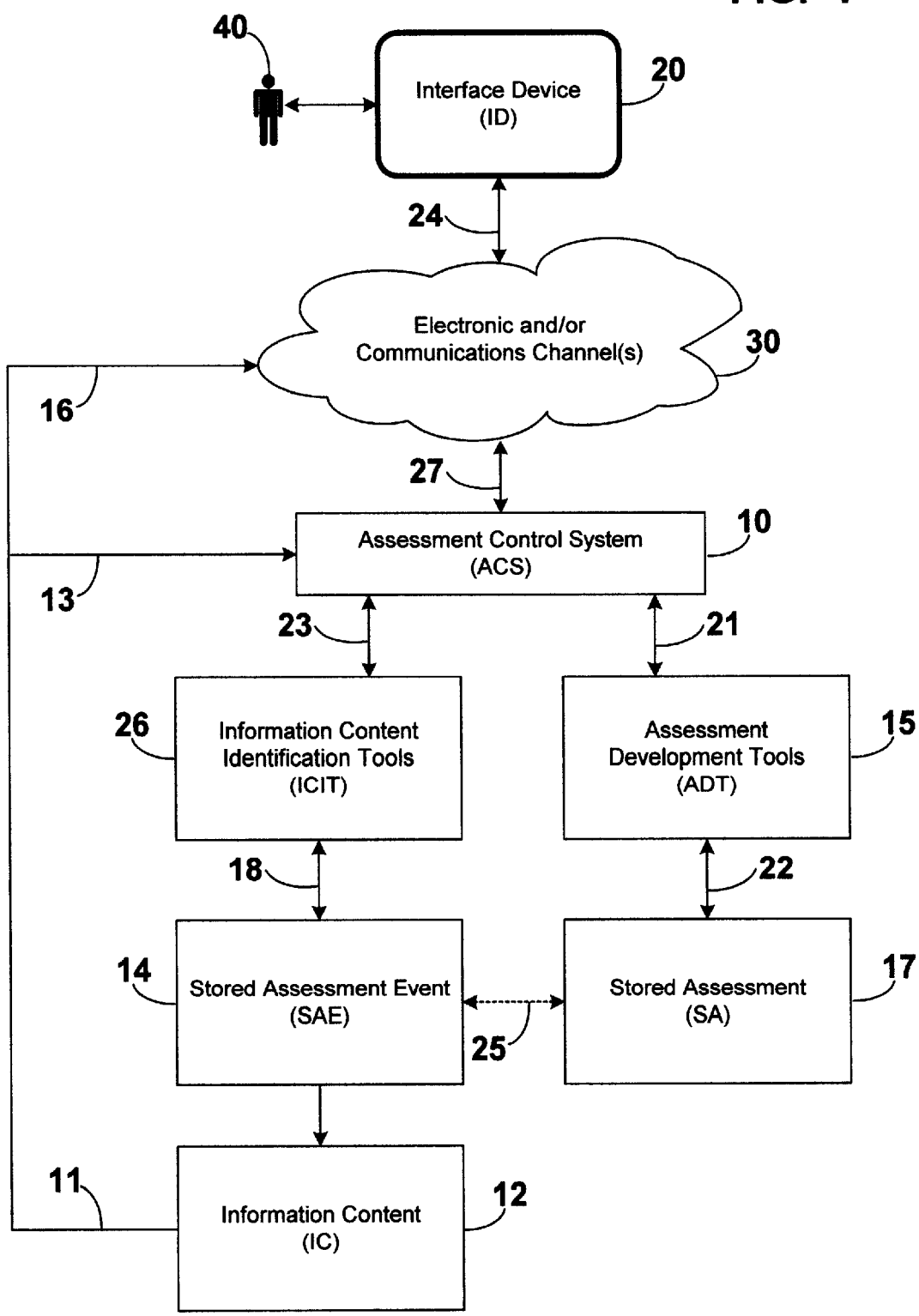
FIG. 1 shows a flow diagram offering a basic overview of this invention.

In the drawings, wherein like reference numerals indicate like elements, there is illustrated in FIG. 1 a flow diagram offering a basic overview of this invention. In the preferred embodiment, a user 40 will use an interface device (ID) 20 to access an assessment control system (ACS) 10 in which the tools are provided for creating and/or maintaining assessments.

For the purpose of this invention, the functions of the ACS 10 include, but are not limited to:
1. providing information content identification tools (ICIT) 26, which allow a user 40 to identify information content (IC) 12 through input of information including information related to the electronic and/or communications channel(s) location(s) of the IC 12;
2. managing the delivery within the ID 20 of both the IC 12, identified by the user 40, and the ICIT 26 in a manner that produces a continuous unified perceptual experience;
3. creating a stored assessment event (SAE) 14 upon the user's decision to save the information contained within the ICIT 26;
4. locating the IC 12 via its electronic and/or communications channel(s) location(s) stored within the SAE 14, and managing the delivery of said IC 12 to the ID 20 of the user 40;
5. providing assessment development tools (ADT) 15, which allow a user 40 to create and/or maintain assessments;
6. managing the delivery within the ID 20 of both the IC 12, identified within the SAE 14, and the ADT 15 in a manner that produces a continuous unified perceptual experience;
7. creating a stored assessment (SA) 17 upon the user's decision to save the information contained within the ADT 15;
8. designating an association 25 between the SA 17 and the SAE 14 upon the user's decision to save the SA 17;
9. allowing the user 40 to edit, add, modify, delete or otherwise adjust information related to the SAE 14 and to the SA 17;
10. allowing the user 40 to access a SA 17, including accessing individual assessment items, for purposes that may include but are not limited to using these to create new assessments and sharing with other users; and
11. associating all saved items to the user 40 including, but not limited to, the SAE 14 and the SA 17.

The functions of the ACS 10 explained above are mentioned as these relate to the current invention. The ACS 10 may include other functions most notably providing the necessary mechanisms to allow the user 40 to offer the assessment to those who are to be assessed.

Invention Overview

Again referring to FIG. 1, the user 40 will access the ACS 10 via an ID 20 that connects 24 to one or more electronic and/or communications channel(s) 30, such as, but not exclusively, computer networks and sources such as Internet, Intranet, and other public and private networks; and/or digital and analog transmission networks and sources such as over-the-air broadcast sources, satellite sources and other wireless sources. Using the ID 20 a user 40, who is uniquely identified, will gain access to the ACS 10, which allows the user 40 to create and maintain assessments. The ACS 10, which connects 27 to one or more electronic and/or communication channels 30 may exist as a stand-alone item or may reside inside of other items such as software used to deliver educational material (e.g., courseware), research testing software or other software that incorporates a component for creating and/or maintaining assessments.

The process of creating assessments begins with the ACS 10 providing and managing delivery to the user's ID 20 of certain components including a component containing the ICIT 26, which the user 40 utilizes for the purpose of identifying IC 12, and a component, that will eventually contain the IC 12 identified by the user. Initially, however, the component containing the IC 12 presents a default IC 12, which will mostly likely change as the user 40 selects and identifies a new IC 12. The user 40 first identifies, through the ICIT 26, information related to the IC 12 including the electronic and/or communication channel(s) location(s) of the IC 12. Upon the user's identification of the IC 12 the ACS 10 manages the delivery to the user's ID 20 of the IC 12. Consequently, both the ICIT 26 and the IC 12 exist concurrently within the user's ID 20.

Once the IC 12 has been identified, the ACS 10 allows the user 40 to create and manage assessments within an ADT 15. To do this the ACS 10 manages delivery to the user's ID 20 of certain components including a component containing the ADT 15, and a component containing IC 12 that was previously identified within the ICIT 26. Consequently, both the ADT 15 and the IC 12 exist concurrently within the user's ID 20.

Thus, with the ADT 15 and the IC 12 existing concurrently within the user's ID 20, an aspect of this invention is to allow a user 40 to create and maintain assessments that are, either directly or indirectly, associated with an IC 12 and to allow for the creation or maintenance of the assessment to take place while both the ADT 15 and the IC 12 exists within the user's ID 20.

Managing Delivery of Information Content

There are two options that may be available through the ACS 10 for managing the delivery of the IC 12 to the ID 20. In option one, the IC 12 follows a path 11 to 13 in which the IC 12 is delivered directly through the ACS 10 which then manages delivery of the IC 12 through the ACS's connection(s) 27 to an electronic and/or communications channel(s) 30 and then through this channel(s) to the user's ID 20 via the ID 20's connection(s) 24 to the channel(s) 30. In option two, the IC 12 follows a path 11 to 16 in which the IC 12 does not go through the ACS 10 but goes through the electronic and/or communications channel(s) 30 and then to the user's ID 20 via its connection(s) 24 to the channel 30. It is important to note that with option two, it is possible that the IC 12 will be delivered through an electronic and/or communications channel(s) 30 that differs from that to which the ACS 10 is delivering other components.

The choice of delivery methods available to the ACS 10 depends on, but is not limited to: the electronic and/or communications channel(s) location(s) of the IC 12; electronic and/or communication channel(s) or system conditions; or, if more than one option is available, the ACS 10 may offer the user 40 a choice of delivery methods.

Managing Delivery of ICIT and ADT

The delivery of the ICIT 26 occurs by following a path 23 in which the ICIT 26 is delivered directly through the ACS 10 which then manages delivery of the ICIT 26 through the ACS's connection(s) 27 to an electronic and/or communications channel(s) 30 and then through this channel(s) to the user's ID 20 via the ID 20's connection(s) 24 to the channel(s) 30.

The delivery of the ADT 15 occurs by following a path 21 in which the ADT 15 is delivered directly through the ACS 10 which then manages delivery of the ADT 15 through the ACS 10's connection(s) 27 to an electronic and/or communications channel(s) 30 and then through this channel(s) to the user's ID 20 via the ID 20's connection(s) 24 to the channel(s) 30.

Saving Information Content and Assessments

Once information related to the IC 12, including its electronic and/or communications channel(s) 30 location(s) has been identified within the ICIT 26, the user 40 may choose to save the information. Upon the user's decision to save, the ACS 10 saves the information as a SAE 14. Each SAE 14 is assigned a unique identifier by the ACS 10 and is stored by the ACS 10 in a storage area that is associated with the ACS 10.

Once an assessment has been created within the ADT 15, the user 40 may choose to save the information. Upon the user's decision to save, the ACS 10 saves the information as a SA 17. Each SA 17 is assigned a unique identifier by the ACS 10 and is stored by the ACS 10 in a storage area that is associated with the ACS 10.

Upon designation of a SA 17, the ACS 10 associates 25 the SA 17 with the SAE 14 for the selected IC 12 that appears within the ID 20. Saving the assessment allows the user 40 to retrieve the SA 17, and if needed, also retrieve its associated IC 12 for later activity.

Access to SAE and SA

If the user 40 wishes to retrieve and/or modify information related to the IC 12, the ACS 10 manages delivery of the SAE 14 to the user's ID 20 following a path 18 through the ICIT 26 and then through the path 23 in which the ICIT 26 and the SAE 14 are delivered directly through the ACS 10 which then manages delivery of the ICIT 26 through the ACS 10's connection(s) 27 to an electronic and/or communications channel(s) 30 and then to the user's ID 20 via the ID 20's connection(s) 24 to the channel(s) 30. In addition to delivering the ICIT 26 containing the SAE 14, the ACS 10 manages delivery to the ID 20 of the IC 12, whose information, including its electronic and/or communications channel(s) 30 location, is identified within the SAE 14. Consequently, both the ICIT 26, containing the SAE 14, and the IC 12 exist concurrently within the user's ID 20.

If the user 40 wishes to retrieve and/or modify a SA 17, the ACS 10 manages delivery of the SA 17 to the user's ID 20 by following a path 22 through the ADT 15 and then through the path 21 in which the ADT 15 and the SA 17 are delivered directly through the ACS 10. The ACS 10 then manages delivery of the ADT 15 through the ACS 10's connection(s) 27 to an electronic and/or communications channel(s) 30 and then through this channel to the user's ID 20 via the ID 20's connection(s) 24 to the channel(s) 30. In addition to delivering the ADT 15 containing the SA 17, the ACS 10 manages delivery to the ID 20 the IC 12, whose information, including its electronic and/or communications channel(s) 30 location, is identified within the SAE 14 that is associate 25 with the SA 17. Consequently, both the ADT 15, containing the SA 17, and the IC 12 exist concurrently within the user's ID 20.

Use of Assessments

If the user 40 chooses and/or if the ACS 10 allows, the user 40 may use the SA 17 for the purposes of delivering it to those who will be assessed (e.g., students, research subjects, employees, etc.). In this way, if the user 40 chooses and/or if the ACS 10 allows, the assessment can be delivered concurrently with its associated IC 12 to those being assessed. However, this invention does not limit its use to this circumstance. The user 40 could, if they choose and/or if the ACS 10 allows, deliver to those being accessed only the SA 17 itself without the IC 12 (e.g., test without the IC 12). In addition, other features may allow the assessment to be transferred or shared with other users.

Overview Using Technology Components

Figure 2:
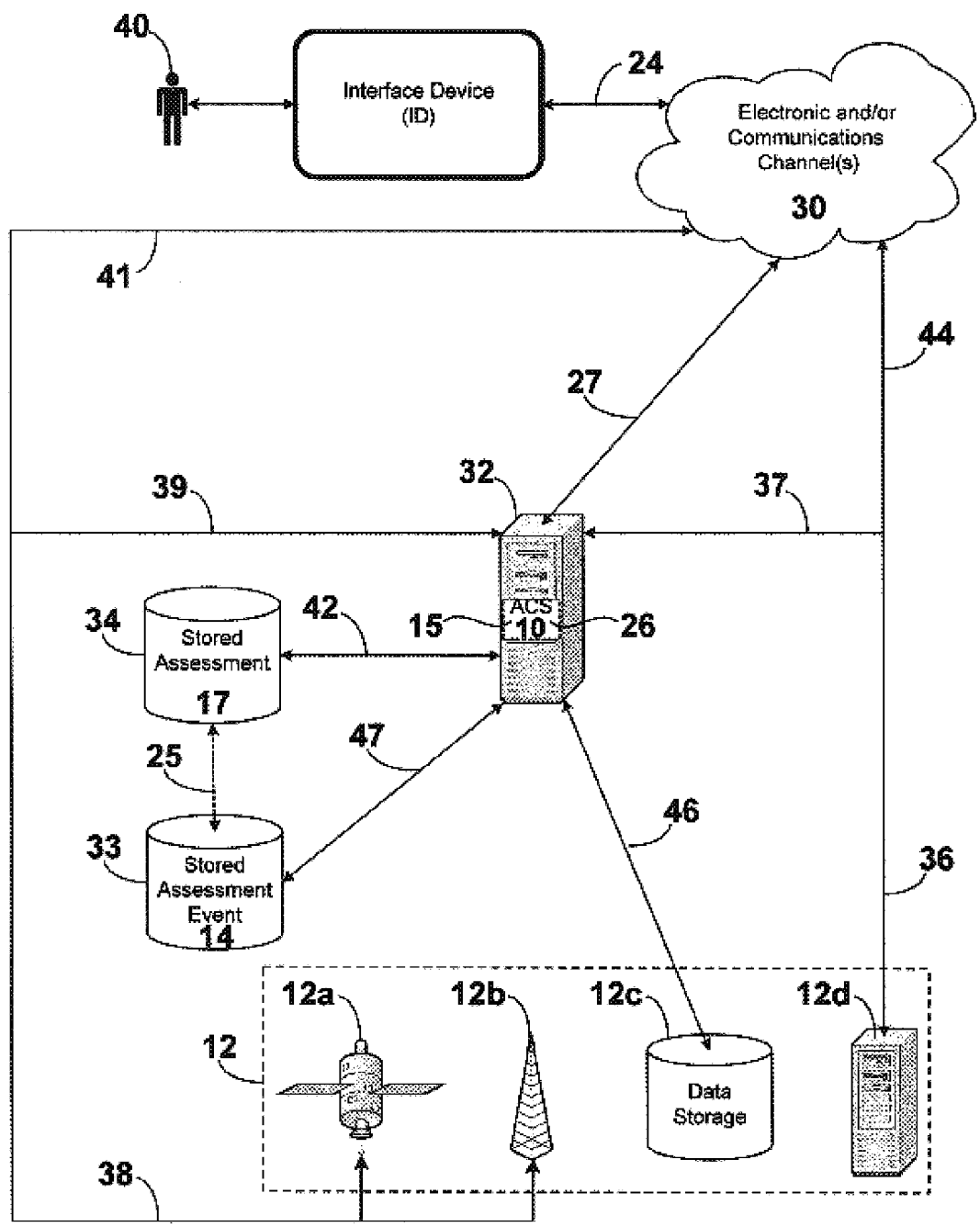
FIG. 2 shows a diagram of an additional presentation of the invention represented within technology components.

FIG. 2 offers an additional presentation of this invention represented within technology components. The user 40, through an ID 20 accesses, via an electronic and/or communications channel(s) 30, the ACS 10 that resides within equipment containing an information technology processor 32. The ACS 10 contains the required electronic tools for creating and maintaining assessments including the ICIT 26 and the ADT 15.

The process of creating assessments begins with the ACS 10 providing and managing delivery to the user's ID 20 of certain components including a component containing the ICIT 26, which the user 40 utilizes for the purpose of identifying IC 12 and a component, that will eventually contain the IC 12 identified by the user. Initially, however, the component containing the IC 12 presents a default IC 12, which will mostly likely change as the user 40 selects and identifies a new IC 12. The user 40 first identifies, through the ICIT 26, information related to the IC 12 including the electronic and/or communications channel(s) location(s) of the IC 12. Upon the user's identification of the IC 12 the ACS 10 manages the delivery to the user's ID 20 of the IC 12. Consequently, both the ICIT 26 and the IC 12 exist concurrently within the user's ID 20.

Locations of Information Content

There are numerous sources that a user 40 may utilize for the purpose of locating the IC 12. These sources include, but are not limited to: a file location(s) that is (are) directly associated with the ACS 10 such as files stored by the user 40 or others on data storage devices 12*c* associated 46 with the ACS 10 or its related programs and applications; a file location(s) that is (are) outside the location(s) of the ACS 10 such as, but not exclusively, those located on Local Area Networks, Internet, Intranets, and/or Extranets 12*d*; communication or frequency location(s) 12*b*, such as, but not exclusively, radio, television, cellular or other analog or digital communications that are either delivered directly over-air or by wireless means or through wireline hookup; or information provided via satellite communications 12*a* either delivered directly over-air or by wireless means or through wireline hookup.

Creation of Stored Assessment Event and Stored Assessment

After the user 40 has identified the IC 12, the ACS 10 offers the option to save the information contained within the ICIT 26, which includes the electronic and/or communications channel(s) location(s) of the IC 12. Upon the user's decision to save, the ACS 10 saves the information as a SAE 14. This process includes the ACS 10 assigning of a unique identifier for the SAE 14, which is associated with the user 40. All information related to the save procedure are saved within a storage area 33 associated 47 with the ACS 10.

Once the user 40 has completed the above identification related to the IC 12, the user 40 can move to creating the actual assessment. To do this the ACS 10 manages delivery to the user's ID 20 of certain components including a component containing the ADT 15 and a component containing the IC 12 that was previously identified within SAE 14. If the IC 12 component is already present from the previous process of identifying the IC 12, then that component may remain unchanged. The ACS 10 uses the electronic and/or communications channel(s) location of the IC 12, contained within the SAE 14, which is stored within storage device 33, to locate the IC 12. Consequently, both the ADT 15 and the IC 12 exist concurrently within the user's ID 20.

Delivery of Information Content

The path of delivery of the IC 12 to the user's ID 20 may occur in one of the following ways:
1. having the IC 12 delivered from an electronic and/or communications channel(s) location(s) stored by the user 40 or others on a data storage device(s) 12*c* associated 46 with the ACS 10 or its related programs and applications, through a path that begins from the storage device(s) 12*c* through the association 46 between the ACS 10 and the storage device 12*c*, through the ACS 10 located in the technology processor 32, through a connection(s) 27 linking the technology processor 32 containing the ACS 10 to the electronic and/or communications channel(s) 30, and then to the user's ID 20 through a connection(s) 24 linking the ID 20 to the electronic and/or communications channel(s) 30;
2. having the IC 12 delivered from an electronic and/or communications channel(s) location(s) 12*d* that include, but are not limited to those located on Local Area Networks, Internet, Intranets, and/or Extranets, through a path 36 to 44 linking the location(s) 12*d* of the IC 12 to the electronic and/or communications channel(s) 30, and then to the user's ID 20 through a connection(s) 24 linking the ID 20 to the electronic and/or communications channel(s) 30;
3. having the IC 12 delivered from an electronic and/or communications channel(s) location(s) 12*d* that include, but are not limited to those located on Local Area Networks, Internet, Intranets, and/or Extranets, through a path 36 to 37 connecting the location(s) of the IC 12 to the ACS 10, then through a connection(s) 27 linking the technology processor 32 containing the ACS 10 to the electronic and/or communications channel(s) 30, and then to the user's ID 20 through a connection(s) 24 linking the ID 20 to the electronic and/or communications channel(s) 30;
4. having the IC 12 delivered from other electronic and/or communications channel(s) location(s) 12*a* and 12*b* such as, though not exclusively, satellite, broadcasting and wireless connections, through a path 38 to 39 connecting the location(s) of the IC 12 to the ACS 10, then through a connection(s) 27 linking the technology processor 32 contain the ACS 10 to the electronic and/or communications channel(s) 30, and then to the user's ID 20 through a connection(s) 24 linking the ID 20 to the electronic and/or communications channel(s) 30; or
5. having the IC 12 delivered from other electronic and/or communications channel(s) location(s) 12*a* and 12*b* such as, though not exclusively, satellite, broadcasting and wireless connections, through a path 38 to 41 linking the electronic and/or communications channel(s) location(s) of the IC 12 to the electronic and/or communications channel(s) 30, and then to the user's ID 20 through a connection(s) 24 linking the ID 20 to the electronic and/or communications channel(s) 30.

Delivery of Assessment Development Tools

The ACS 10, which resides within an information technology processor 32, also manages delivery of the ADT 15. A user 40 creates and maintains assessments within the ADT 15 component. The path of delivery of the ADT 15 managed by the ACS 10 has the ADT 15 delivered through a connection 27 linking the technology processor 32 containing the ACS 10 to the electronic and/or communications channel(s) 30, and then to the user's ID 20 through a connection(s) 24 linking the ID 20 to the electronic and/or communications channel(s) 30.

Once an assessment has been created within the ADT 15, the user 40 may choose to save the information. Upon the user's decision to save, the ACS 10 saves the information as a SA 17. Each SA 17 is assigned a unique identifier by the ACS 10 and is stored by the ACS 10 in a storage area 34 that is associated 42 with the ACS 10. Upon designation of a SA 17, the ACS 10 associates 25 the SA 17 with the SAE 14 for the selected IC 12 that appears within the ID 20.

Path of User Activity

Activity associated with identifying information content and creating assessments that a user 40 inputs and submits travels a path from the ID 20 through a connection(s) 24 between the ID 20 and the electronic and/or communication channel(s) 30, then through a connection 27 linking the electronic and/or communications channel(s) 30 with technology processor 32 containing the ACS 10. The ACS 10 then directs the users activity to the appropriate areas controlled by the ACS 10.

Information Related to User's Interface Device

Figure 3A:
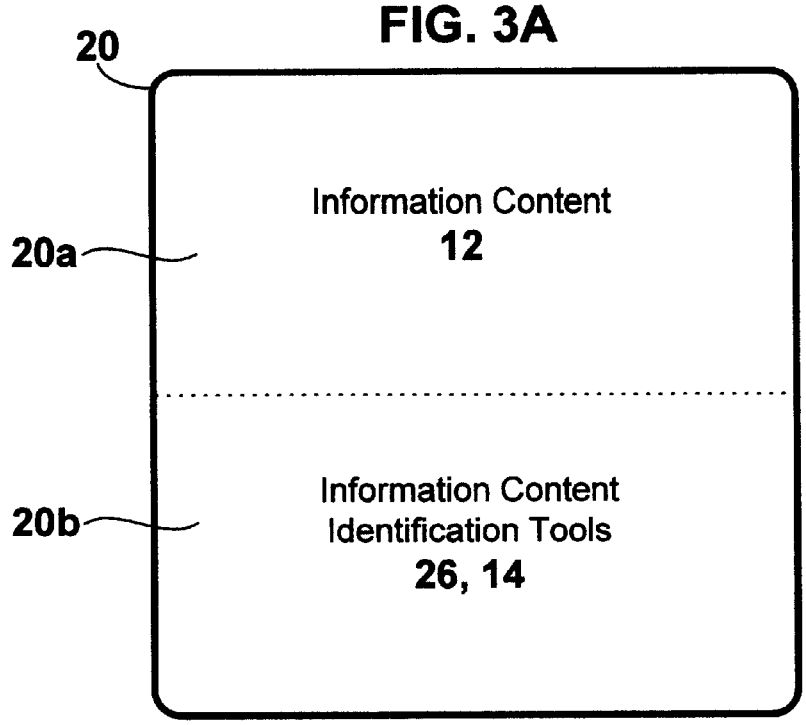
FIGS. 3A, 3B and 3C illustrate the presence of multiple components within a user's interface device.
Figure 3B:
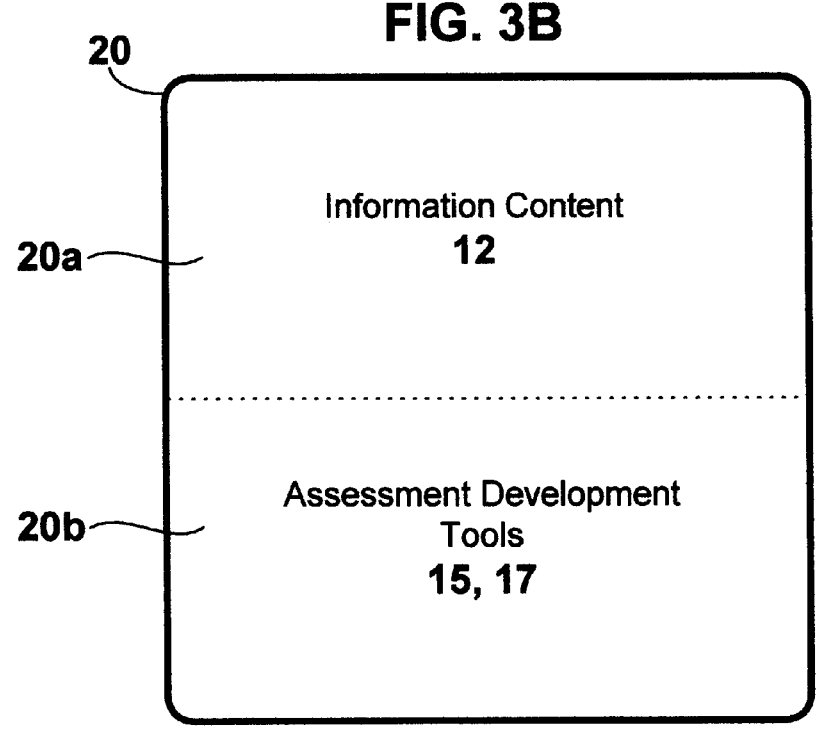

FIG. 3A and FIG. 3B provide more detail on the ACS's management of information delivery to the user's interface device. The user's ID 20 can be thought of as all connected, interrelated or otherwise associated equipment or devices that allow a user to experience and/or interact with available, authorized and/or otherwise accessible resources available through an electronic and/or communications channel(s).

In FIG. 3A the ID 20 is further distinguished by two components. Now relating information in FIG. 2 with the information in FIG. 3A, the ACS 10 manages delivery to the user's ID 20, within component 20a, of the IC 12, which the ACS 10 locates based on information related to the electronic and/or communications channel(s) location(s) of the IC 12 identified by the user. The IC 12 is mostly likely, though not exclusively, either directly or indirectly the subject or purpose for which the said information assessment is being created or maintained.

Now relating information in FIG. 2 with the information in FIG. 3A, the ACS 10 also manages delivery to the user's ID 20, within component 20b the tools for identifying the information related to the IC 12, namely the ICIT 26. As shown in FIG. 3A the ICIT 26 may also include the SAE 14 if the user is accessing a previously created SAE 14, for the purpose of making modifications or adjustments.

FIG. 3B shows that the ACS 10 also manages delivery to the user's ID 20, within component 20b, the tools needed to create and maintain assessments, namely the ADT 15. The ADT 15 allows for, though is not limited to: 1) a plurality of assessment types (e.g., multiple choice, true-false, essay, personal evaluations, etc.); 2) a plurality of items within each assessment type (e.g., one or more multiple choice questions, one or more short answer or comment statements, etc.); and 3) the development of assessments in a plurality of electronic or communications formats such as, though not exclusively, text, graphics, animation, video, audio, over-the-air transmission such as television and radio, tactile materials, olfactory materials, and other information formats. As shown in FIG. 3B the ADT 15 may also include the SA 17 if the user is accessing a previously created SA 17, for the purpose of making modifications or adjustments.

Potential Other Items Within ADT and ICIT

In addition to containing tools for identifying information related to the IC 12, the ICIT 26 may also contain additional information and tools, such as but not limited to: 1) tools or information to help the user locate, select or otherwise provide assistance with choosing the IC 12; 2) feedback, ratings, counts and/or discussion options that allow users to gain insight or opinion from other users regarding information content; 3) translation tools for translating IC 12 for the user or for those being assessed; 4) summarization tools allowing for automatic summarization or categorization of material within the selected IC 12; 5) summary or indexing tools that offer the user information regarding information content that have been previously selected by the user; and 6) in the case where the ICIT 26 contains the SAE 14 there may exist information related to the SAE 14's association with a SA 17 such as number of questions and question types.

In addition to containing tools for creating and maintaining assessments, the ADT 15 may also contain additional information and tools, such as but not limited to: 1) materials to allow the user to provide instructions or descriptions to assist those being assessed; 2) details or other information regarding the selected IC 12 to which the assessment is related including its electronic and/or communications channel(s) location(s); 3) reference materials such as dictionary, encyclopedia or other information items; 4) feedback on previously created assessment information such as information showing results from those who have previously taken the assessment; 5) development assistance materials such as spell checking and grammar checking, and links to other sources of information; and 6) summary or indexing tools that offer the user information regarding assessments that have been previously created by the user.

Explanation of Continuous Unified Perceptual Experience

Again relating to FIG. 3A and FIG. 3B, both the IC 12, contained in component 20a, and the ADT 15 and ICIT 26, contained in component 20b, whose delivery to the ID 20 is managed by the ACS 10, are presented within the user's ID 20 in a form that produces a continuous unified perceptual experience for the user.

A continuous unified perceptual experience exists when one or more sensory inputs or stimuli are present, either concurrently or in a sequential order, so that the user's overall experience or awareness registers as a single or series of associated and undisturbed events. For the purpose of this invention such an experience takes place within the experience obtained when interacting, either passively or actively, with certain interface devices connected to an electronic and/or communications channel(s). The main principle behind the continuous unified perceptual experience is that the person who is registering the experience when interacting with the interface device is perceiving that the stimuli they are experiencing are linked or unified in manner that suggests to the person that the stimuli are associated with a specific item or application and/or are emanating from a single source. A disruption to the link that establishes the perceived connection of stimuli results in a disruption to the person's perceptual experience. A distinction is not made based on length of time of exposure to the stimuli but on common characteristics that link the stimuli and that these links are relevant within the context of the person's current expectations of the perceptual experience.

For the purpose of this invention, examples may include, but are not limited to: information provided through a single computer application such as a single web browser; programming provided through a single analog or digital wireline broadcast source such as cable sources and programming provided through a single analog or digital wireless broadcast source such over-the-air television and radio, satellite, and other wireless applications. In each of these examples someone whose current perceptual experience is focused on the information (i.e., stimuli) provided by these sources recognizes that these are linked as long as the delivery of the stimuli remains undisturbed within the user's expectations of the perceptual experience.

Figure 3C:
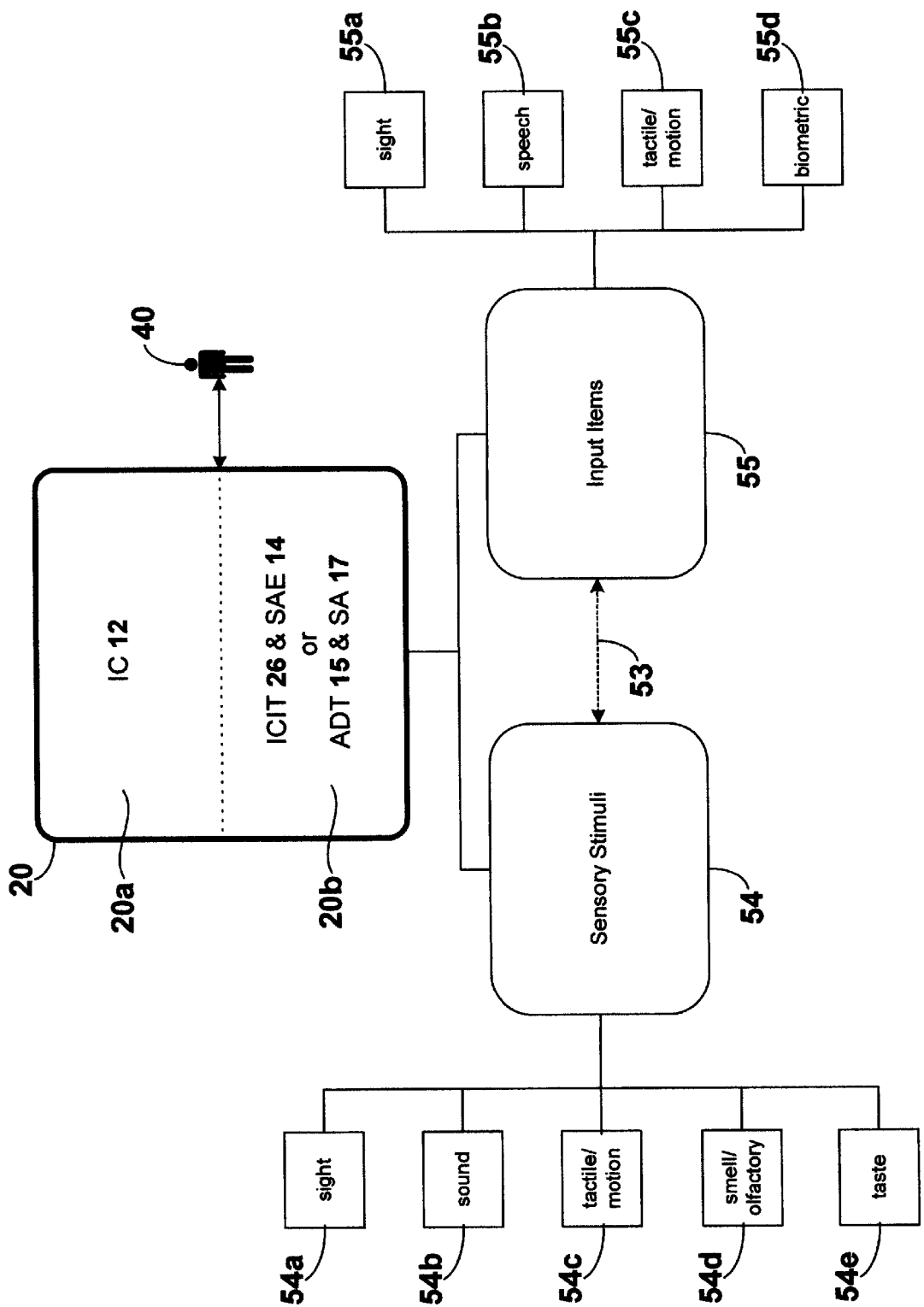

This can be seen in FIG. 3C, which provides a conceptual representation of potential items that may be included within a user's continuous unified perceptual experience of the preferred embodiment. The overall experience can be divided into two distinct, though interrelated 53, elements. First, there exists sensory stimuli 54 that the user 40 derives from simply being within the presence of the interface device. The sensory stimuli that impact the user's senses include the presence of one or more stimuli dealing with sight 54a, sound 54b, tactical/motion 54c, smell/olfactory 54d, and/or taste 54e. Such items may include, but are not limited to: video screens such as computer and television screens; video projection machines; audio or sound apparatus; scent emitters; items producing vibration or motion; and taste providers.

Second, there exists input items 55 that connect the user 40 to the interface device in a way that permits the user 40 to interact with the sensory stimuli information that is being presented. Such interactive items associated with the ID 20 generally fall, though not exclusively, into items that allow for user 40 interactivity such as those dealing with sight 55a, speech 55b, touch/motion 55c and biometrics 55d. Such items may include, but are not limited to: computer keyboards; other computer input items such as a mouse, scanning devices, input pads or sticks; pupil or eye trackers; remote control devices; and touch sensors.

Performing Activity Within the Interface Device

Now referring to FIG. 2 and FIG. 3C, the ACS 10 manages delivery to the user's ID 20 of multiple components, with the preferred embodiment encompassing a component 20a, in which the IC 12 is contained, and a component 20b, in which the ICIT 26 or ADT 15 are contained. To the user 40 the components exist within a continuous unified perceptual experience in the ID 20 in which sensory stimuli 54 along with input items 55 are present either concurrently or in relevant sequence order so that the user's overall experience registers as a single or unified event. However, functionally the components are separate, since these are drawn from separate electronic and/or communications channel(s) location(s), namely the IC 12 is drawn from its location(s) while the ICIT 26, which may contain the SAE 14 or the ADT 15, which may contain the SA 17, are drawn from their location(s). The "separate-but-one" experience enables the user 40 to perform activity within one component, using one or more input or interactive mechanisms 55 associated with the ID 20. In this way performing activity within one component will not materially affect the perceptual experience the user 40 is deriving from the component in which activity is not being performed.

Figure 4A:
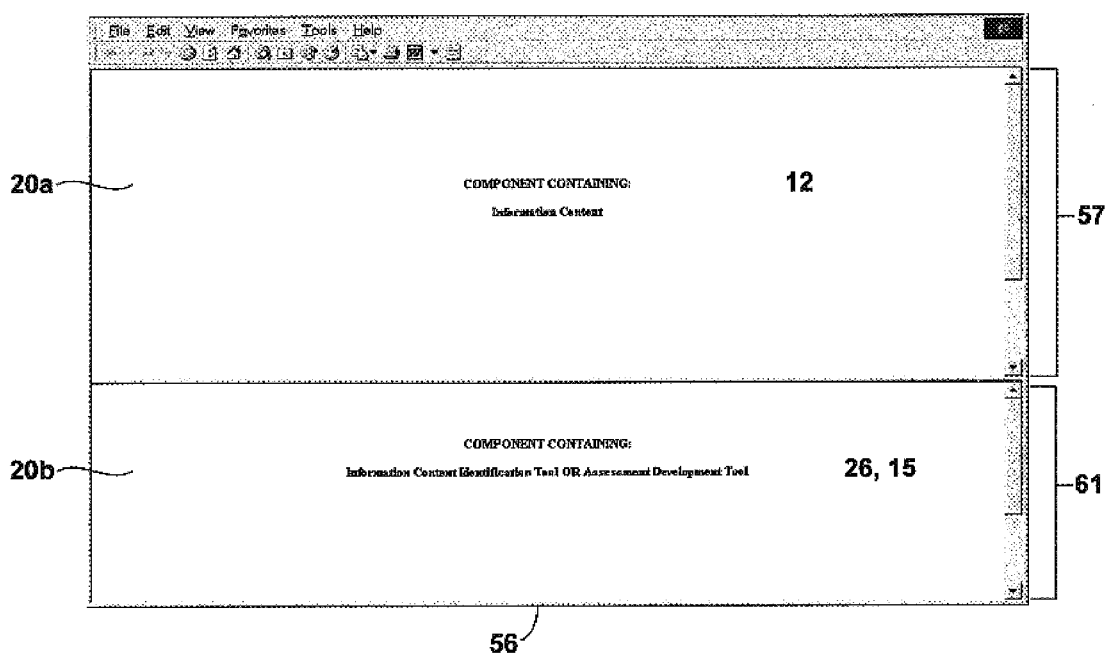
FIGS. 4A, 4B and 4C show conceptual representations of a single web browser containing multiple components.

For example, one form for creating assessments is through electronic and/or communications channel(s) that utilize protocols associated with the World Wide Web. In this environment a single web browser may serve as the single application that is providing the continuous unified perceptual experience, including potentially multiple sensory stimuli, within the user's ID 20. As shown in FIG. 4A a single web browser 56 may be used to allow for the IC 12 to appear in one portion of the browser while the ICIT 26 or the ADT 15 appear in another portion of the browser. The upper portion 57 of the web browser consists of component 20a, which contains the IC 12, while in the lower portion 61 of the web browser consists of component 20b, which contains the ICIT 26 or the ADT 15.

The information within components 20a and 20b is drawn from separate electronic and/or communications channel(s) location(s) and each is presented in a separate frame but appear together within a single web browser 56. With this arrangement the user can separately manipulate one component while the other component remains undisturbed. Using input items associated with the ID 20, the user can move between either component without altering the experience the user obtains from the other component. The act of moving between components 20a and 20b does not disturb the contents of the components unless the user directly manipulates them. The act of performing activity within one component likewise does not alter the user's continuous unified perceptual experience since user interaction is an expectation that exists with the experience (e.g., mouse clicks) associated with using web browsers. The act of moving between components does not affect the percentage of perceptual experience occupied by a component unless the user intentionally alters the percentage using the input mechanism. However, adjusting the percentage of perceptual experience occupied by each component does not alter the continuous unified perceptual experience since the activity involved in doing so can be considered within the boundaries of the expectations of interacting with the web browser 56.

User Activity Within Web Browser

Figure 4B:
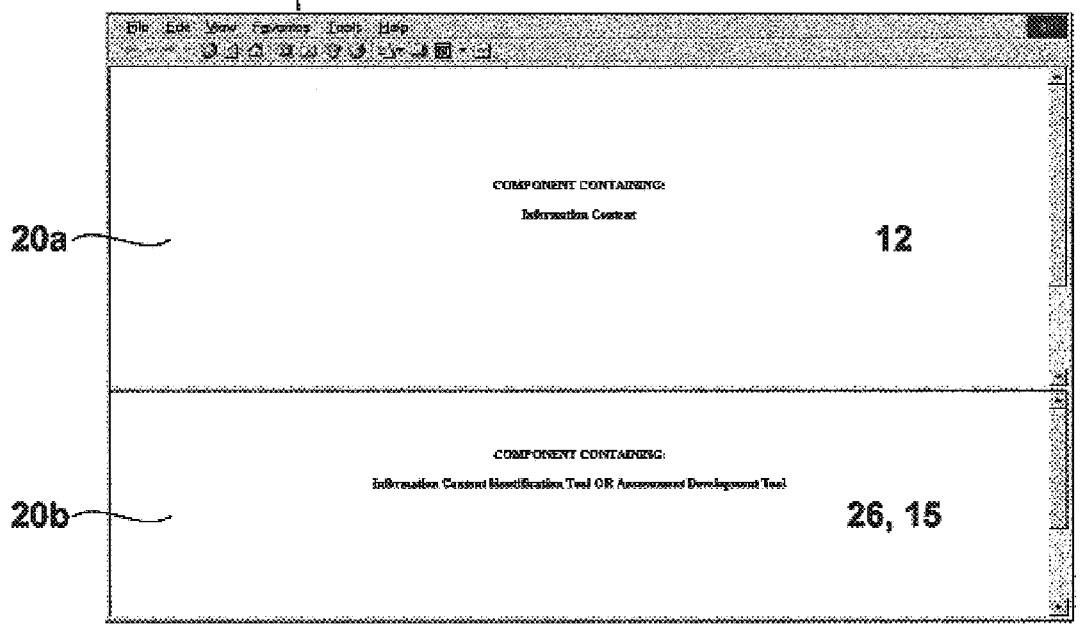
Figure 4C:
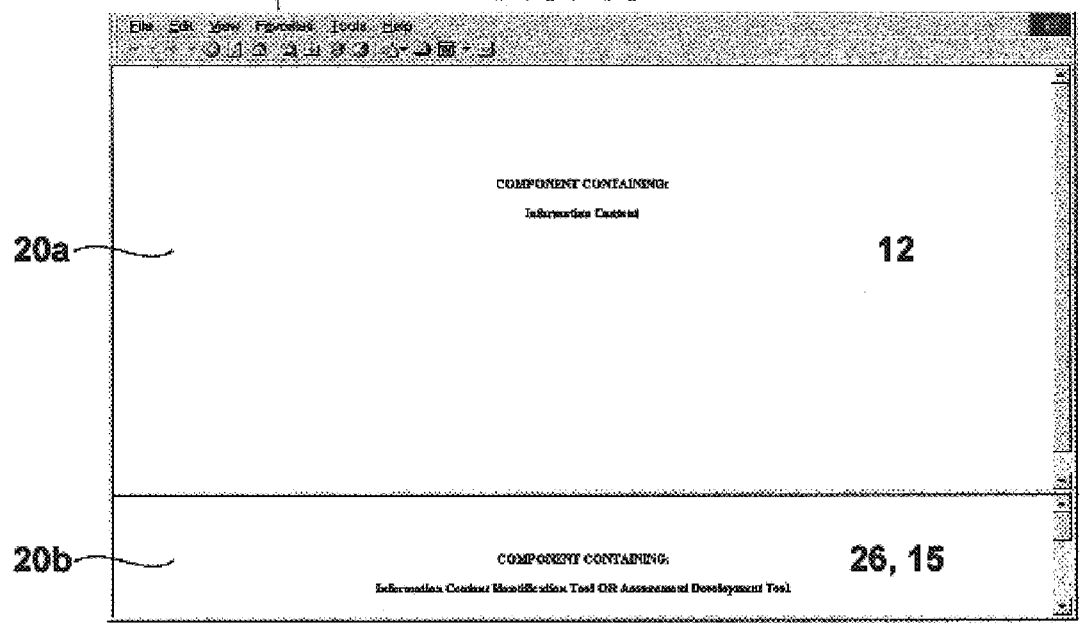

FIG. 4B shows a before representation and FIG. 4C shows an after representation of a single web browser 56 which contains two components 20a and 20b consisting of information drawn from separate electronic and/or communications channel(s) location(s). Both FIG. 4B and FIG. 4C show the same component 20a containing the IC 12 and the same component 20b containing either the ICIT 26 or the ADT 15. In the after representation shown in FIG. 4C the user's activity has reduced the space occupied by the ICIT 26 or the ADT 15 in component 20b, which has resulted in a somewhat larger area being occupied by the IC 12 in component 20a compared to the before representation in FIG. 4B. However, by making this adjustment the user has consciously permitted the sensory experience to be altered as part of the interaction process. The single browser 56 containing the multiple components is still displayed and while components 20a and 20b within the browser 56 in FIG. 4C have been adjusted in terms of the percentage of screen space each represents, the single web browser 56 remains within the user's continuous unified perceptual experience.

The representations using web browsers shown in FIG. 4A, FIG. 4B and FIG. 4C, while useful for effectively understanding the invention, is not limited to this embodiment since other methods may also be employed that do not use a web browser page for delivering the continuous unified perceptual experience.

Other Arrangement of Components

It should be noted that in FIG. 3A the arrangement of components controlled by the ACS 10 and provided within the user's ID 20 represent only one of a plurality of arrangements of components, which are potentially available since there are numerous interface device options that can handle a plurality of different stimuli types and offer a plurality of input devices. In all cases the main objective of the ACS 10, in terms of delivery, is to produce a continuous unified perceptual experience within the user's ID 20. For instance, while FIG. 3A shows a horizontal arrangement with the IC 12 appearing in an upper component while the ICIT 26 or ADT 15 appears in a lower component it is conceivable that components could be presented vertically with, for example, the ICIT 26 or ADT 15 on the left side of a visual ID 20, such as a computer screen or television, and the IC 12 is on the right side. Clearly additional arrangements are possible including those that involve only partial or no visual stimuli. For instance, audio methods may be used to present the IC 12, with the audio being produced within the ID 20 through an audio producing device such as audio speakers. In this embodiment the ADT 15 may appear on a computer screen and thus allows the user to create or maintain an assessment while listening to the IC 12. Or to extend this example further, the user could develop the assessment using voice recognition technology in which case neither the IC 12 nor the ADT 15 may involve visual stimuli.

Assessment Creation

Figure 5:
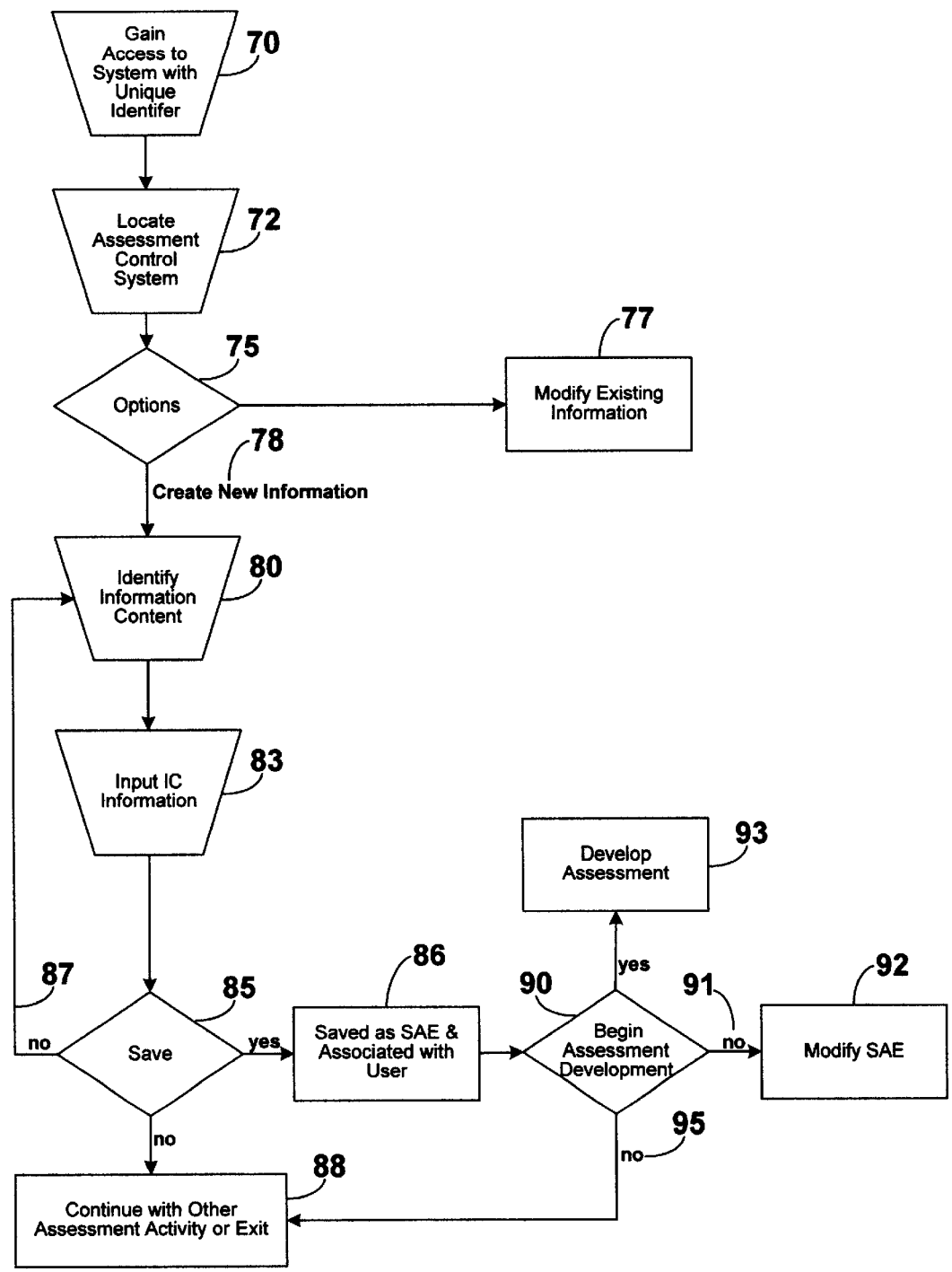
FIG. 5 shows a flow diagram representing the initial steps involved in the development of assessments including the identification of information content.

FIG. 5 shows a flow diagram representing the initial stages in the development of assessments. The diagram shows several steps that reflect the flow of information that occurs in order to create or modify assessment information. Now relating information in FIG. 2 with the information in FIG. 5, to gain access to the ACS 10 the user 40 must enter information 70 (e.g., username, password, other personal identification) that associates the user 40 with an internal unique identifier. The unique identifier allows the ACS 10 to associate further user 40 action to the user 40 via their unique identifier.

The ACS 10 may operate as a stand-alone item that is accessed directly or may reside within a more complex offering requiring the user 40 to maneuver to the section containing the ACS 10. In either situation the user 40 must locate 72 the ACS 10. Once the user 40 has completed all tasks needed to gain access, the ACS 10 may present the user 40 with certain options 75 which may include creating new assessment information 78 or modifying existing assessment information 77.

Creating New Assessment Information—Identifying Information Content

To begin the process of developing a new assessment 78, the user 40 must first identify 80 information content IC 12, which is most likely the information that is either directly or indirectly the subject or purpose for creating an assessment. For example, the IC 12 may be material within a company's technical manual, which is available in electronic form, and the assessment is being developed based on material in the manual. In the preferred embodiment, the identification 80 of the IC 12 includes, among other information, its electronic and/or communications channel(s) location(s) which may include, but is not limited to: an electronic storage file location(s); computer network address; over-the-air frequency or other electronic and/or communications channel(s) location(s). The IC 12 may be any electronic and/or communications format that can be accessed, transferred, transmitted, read and/or otherwise made available using electronic and/or communications channel(s) methods or protocols and that produce one or more sensory stimuli including but not limited to text, graphics, audio, video, animation, olfactory and/or tactile/motion forms.

The ACS 10 instructs the user 40 to identify 80 information related to the IC 12 including its electronic and/or communications channel(s) location(s), and then enter or input 83 this information. The entry or input of information related to the IC 12, in particular, its electronic and/or communications channel(s) location(s), can be either self assigned via direct user 40 input using an input device associated with ID 20, such as, but not limited to, entering the location(s) via keyboard, mouse or through speech recognition methods; or the ACS 10 may automatically track certain information related to the IC 12, in particular, its electronic and/or communications channel(s) location(s) as a user 40 investigates or searches for the IC 12.

Referring now to FIG. 3A, the ICIT 26, contained within component 20b, may allow the user to search for IC 12 directly within the ICIT 26. In this way the input within the ICIT 26 of information related to the IC 12, in particular its electronic and/or communications channel(s) location(s), would result in the ACS 10 managing the delivery of the selected IC 12 within component 20a. In addition, the ICIT 26 may offer the user access to a directory of IC items that were pre-selected, recommended, or previously used by the user or by other users. A selection of one of these IC items would result in the ACS 10 managing the delivery of the selected IC 12 within component 20a.

When the user has selected an IC 12, the ACS 10 allows the user to save the information related to the IC 12, including its electronic and/or communications channel(s) location(s) via a user input instruction using the ID 20 such as, but not limited to, a mouse click, pressing a certain button on a keyboard or speech recognition.

Referring again to FIG. 5 and FIG. 2, when the user 40 has identified and inputted information related to the IC 12, the ACS 10 provides the user 40 with the option 85 to save the information for the purpose of possible use as part of the assessment creation process. If the user 40 wishes to save the information related to the IC 12 contained within the ICIT 26, the ACS 10 saves 86 the information as a stored assessment event, SAE 14 in FIG. 2, and stores all information within an electronic storage area 33, shown in FIG. 2, which is associated 47 to the ACS 10. The step of saving as a stored assessment event 86 also results in the saved information being associated with the user 40.

Once the IC 12 has been identified, inputted and stored, the ACS 10 offers the user 40 the option 90 to begin to develop the actual assessment. If the user 40 chooses 93 to start this process the ACS 10 presents the user 40 with the tools needed to develop the assessment, namely the ADT 15. This process is further explained in FIG. 6. The user may also choose 91 not to develop the actual assessment at this point but may choose to modify 92 the current SAE 14. This process is further explained in FIG. 8. Finally the user may choose 95 not to develop the actual assessment nor modify the current SAE 14 in which case the user may choose to undertake other activity offered by the ACS 10 or can exit the entire assessment process 88.

If the user 40 chooses at 85 not to save the information related to the IC 12 contained within the ICIT 26, the user 40 may either choose 87 to start the process over by identifying another IC 12 item or may choose to undertake other activity offered by the ACS 10 or can exit the entire assessment process 88.

Creating a New Assessment

Figure 6:
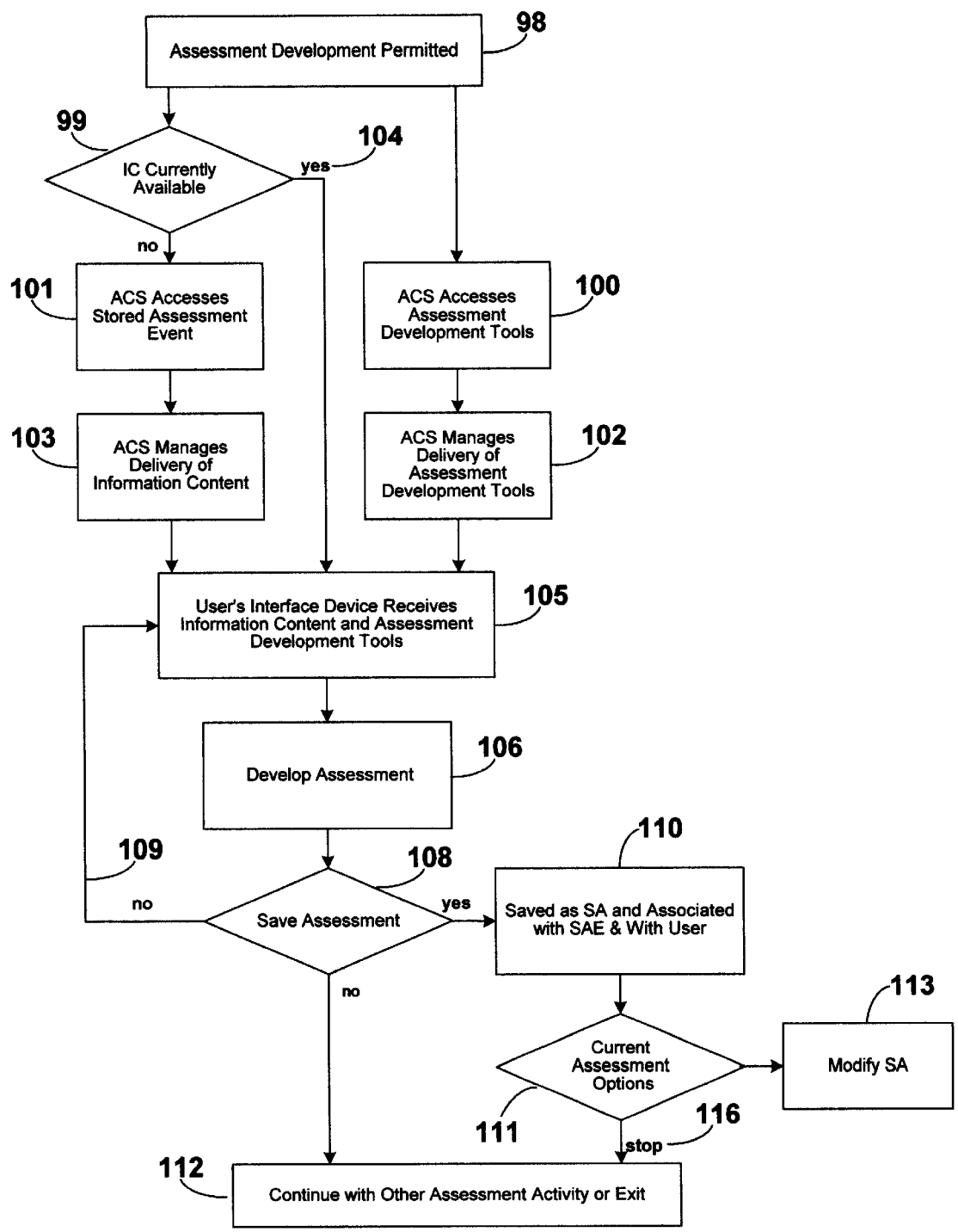
FIG. 6 shows a flow diagram representing the steps involving the process of creating assessments once information content has been identified.

FIG. 6 shows a flow diagram representing the steps carried out in the process of creating a new assessment once a stored assessment event has been designated and the assessment development process is permitted 98. Now relating FIG. 2 with FIG. 6, to create the assessment the ACS 10 determines 99 whether the IC 12 is currently present 104 within the user's ID 40. This will be the case, as shown in FIG. 5 at 93, if the user 40 has elected to begin the actual assessment development process when the IC 12 was identified and saved in the ICIT 26 and a SAE 17 was designated. Consequently, the IC 12 will be available 105 to the user 40 through their ID 20.

In instances where the IC 12 is not present, the ACS 12 must accesses 101 from that part of electronic storage area 33 associated 47 to the ACS 10 that is assigned to the user 40, the SAE 14 which includes the electronic and/or communications channel(s) location(s) of the IC 12. Next the ACS 10 manages delivery 103 of the IC 12 to the user's ID 20. Once the IC 12 is either partially or fully retrieved, it is made available 105 to the user 40 through their ID 20 in a form that is managed by the ACS 10.

Concurrently while the ACS 10 is carrying out the functions related to the IC 12 described above, it is also accessing 100 the electronic tools used for developing the assessment, namely the ADT 15. Next the ACS 10 manages delivery 102 of the ADT 15 to the user's ID 20. The ADT 15 is made available 105 to the user 40 through their ID 20 in a form that is managed by the ACS 10. For the present invention the form in which the IC 12 and the ADT 15 are presented to the user's ID 20, is one that produces, for the user 40, the previously discussed continuous unified perceptual experience within the ID 20.

With the IC 12 and the ADT 15 now available through the user's ID 20 the user 40 may begin to develop the assessment 106. As previously discussed, the ADT 15 allows for the creation of a plurality of assessment types, a plurality of items within each assessment type and a plurality of format options. Thus, what is referred to as an assessment may, in fact, consist of many individual assessment items (e.g., many different questions). However, as will be shown shortly creating an assessment may also occur even though no assessment items have been created.

At any point during the assessment creation process the ACS 10, through the ADT 15, offers the user 40 the option 108 to save the assessment as a SA 17. If the user 40 chooses to save the assessment, the ACS 10 associates 110 the SA 17 with SAE 14 from which the ACS 10 drew the electronic and/or communications channel(s) location(s) of the IC 12. Referring to FIG. 2, this association is exhibited in 25.

As noted the ACS 10 through the ADT 15 allows for assessments to be saved at anytime during the assessment creation process even if the user 40 has yet to create an assessment item. Thus, it is possible that an association 25 between a SA 17 and the SAE 14 can occur even though the user 40 does not actually create any assessment items. The process of saving an assessment 110, whether assessment items are created or not, is enough to register an association 25 in FIG. 2 between the SAE 14 and the SA 17. In effect by doing this the user 40 has created an assessment that contains no assessment items (e.g., no questions) and the step of developing the assessment 106 essentially leads to the user 40 not actually creating any assessment items.

Using the Same IC for Other Assessments

Looking at FIG. 2, the association 25 made by the ACS 10 between the SA 17 and the SAE 14 from which the ACS 10 drew the electronic and/or communications channel(s) location(s) of the IC 12, is itself unique. That is, when an assessment is created and saved it is associated 25 with the IC 12, through the SAE 14. This association 25 is uniquely identified.

However, the ACS 10 allows for flexibility in the use of the IC 12 and SA 17 for the purpose of creating other assessments. For instance, the association 25 between an IC 12, through the SAE 14, and a SA 17 does not prevent the IC 12 from being associated with another assessment (e.g., same IC 12 but different questions). That is, the user 40 could follow the same process described in this invention and utilize the same IC 12 to create a different assessment. By doing so the ACS 10 will designate a new SAE 14, a new SA 17 and a new association 25. Thus while a user 40 may have used the same IC 12 for two or more assessments, each SAE 14 containing the information related to the IC 12 are uniquely identified. Consequently, a user 40 could conceivably use the same IC 12 to develop multiple assessments.

Using the Same SA or SA Items in Other Assessments

In addition, a SA 17 can be associated with a different IC 12 (e.g., same questions used for different IC 12). While the ACS 10 establishes a unique association 25 between a SAE 14 and a SA 17, it does not limit the use of SA 17 to only the associated SAE 14 for which it was originally developed. Thus a user 40 can utilize a previously develop SA 17 (which may contain multiple assessment items) and have the ACS 10 associate 25 it with a different SAE 14. By doing so the ACS 10 would designate a new SAE 14, a new SA 17 and a new association 25. Thus while the user 40 may have used the same SA 17 for two or more assessments, each SA 17 is uniquely identified. Consequently, a user 40 could conceivably use the same SA 17 to develop multiple assessments.

Also, individual assessment items (e.g., individual questions within an assessment) created for a particular assessment are not limited to use only with that SA 17. If the ACS 10 permits the user 40 can selectively choose individual assessment items from one or more SA 17 for the purpose of being used to create a new assessment or to add to a previously developed SA 17. Also, if the ACS 10 permits, some or all assessment items from some or all SA 17 can be included or be made available within a pool of assessment items from which the user 40 can choose for the purpose of creating new assessments or for adding to a previously created assessment(s). In this manner assessment items can be at once associated with one (or more) SAE 14 and also available as separate unassociated assessment items. Thus the ACS 10 allows for the creation of a plurality of unique SAE 14 that may contain the same assessment items.

Once again referring to FIG. 2 and FIG. 6, once the user 40 saves the assessment 110, the user 40 can choose from several options 111 with the current assessment. First, the current assessment can be immediately modified 113. Alternatively the user 40 may choose to stop 116 the process at which point the ACS 10 will allow the user 40 to continue with other assessment activity or exit the entire assessment creation process 112.

If the user's choice for the save assessment option 108 is not to save, the user 40 may choose to start the process over 109 by being presented 105 with both the IC 12 and the ADT 15 within the user's ID 20. Alternatively, if the user 40 chooses not to save the assessment the user 40 may choose to continue with other assessment development or exit the entire assessment creation process 112.

Modifying Assessments

Figure 7:
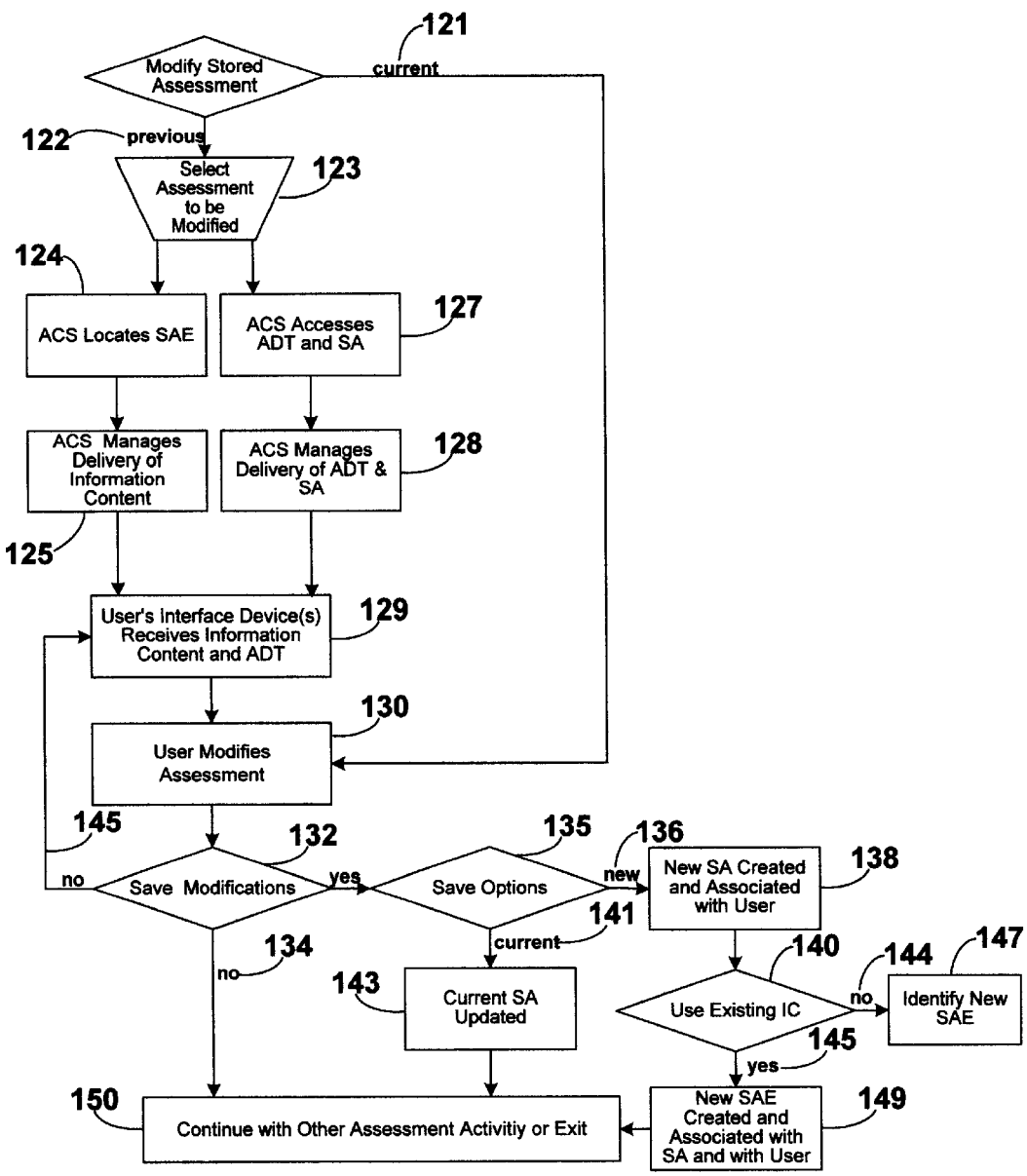
FIG. 7 shows a flow diagram representing the steps involving the process for modifying a stored assessment.

FIG. 7 shows a flow diagram representing the steps carried out in the process of modifying a previously stored assessment. Modification can take place on either a currently available assessment 121 or on a previously stored assessment 122.

Modify Stored Assessments—Not Currently Available

Now referring to FIG. 5, in the case where a previously stored assessment is not currently available, the user must maneuver to that part of the ACS 10, which contains the option 75 that includes modifying existing information 77.

Now referring to FIG. 2 and FIG. 7, the ACS 10 allows the user 40 to make modifications to the SA 17 using the ADT 15. The modification may include changes, additions and/or deletion to a selected SA 17 such as, but not limited to, changing response options, adding new items, and altering sequence of items.

Upon choosing the option to modify 122 a previous SA 17, the user 40 must then choose 123 the assessment that is to be modified. Once the user 40 has selected the assessment to be modified the ACS 10 locates 124 the SAE 14 from that part of electronic storage area 33 associated 47 with the ACS 10 that is assigned to the user 40 and that is associated 25 with the selected SA 17. Next the ACS 10 manages delivery 125 of the IC 12, which is identified within the SAE 14, to the user's ID 20. Once the IC 12 is either partially or fully retrieved, it is made available 129 to the user 40 through their ID 20 in a form that is managed by the ACS 10.

Concurrently while the ACS 10 is carrying out the functions related to managing the delivery of the IC 12 described above, it is also accessing 127 the electronic tools used for developing the assessment, namely the ADT 15. In addition to accessing the ADT 15, the ACS 10 also accesses the SA 17 from the storage area 34 associated 42 with the ACS 10 that is assigned to the user 40 and then manages delivery 128 of the ADT 15, which contains the SA 17, to the user's ID 20. The ADT 15 and its contents are made available 129 to the user 40 through the ID 20 in a form that is managed by the ACS 10. For the present invention the form in which the IC 12 and the ADT 15 are presented to the user's ID 20, is one that produces, for the user 40, the previously discussed continuous unified perceptual experience within the ID 20.

With the IC 12 and the ADT 15, which contains the SA 17, now available through the user's ID 20, the user 40 may begin to make modifications 130 to the assessment.

When the user 40 has finished modifications to the assessment the ACS 10, through the ADT 15, offers the user 40 the option 132 to save the modifications. If the user 40 chooses to save the modifications, the ACS 10 may offer two options 135 for saving the modifications. First, the modifications could replace certain information in the current assessment 141 in which case the modifications are saved in place of the existing information 143. By doing so all other identifiers and associations, such as the unique identifiers assigned when the SA 17 was originally created, remain unchanged.

Second, the user 40 may wish to save the modifications as a new assessment 136 rather than replacing an existing SA 17. In this case the information within the SA 17 selected for modification remains unchanged. If the user 40 chooses to save as a new assessment then the ACS 10 saves 138 the information as a new SA 17 and associates this with the user 40. In this way the modification process can, in effect, be used as a new assessment creation process. For example, a teacher may wish to create two or more assessments (e.g., sets of questions) to be used for the same IC 12, that was previously identified and associated, 25 in FIG. 2, with the SA 17 that was chosen for modification. Upon choosing 136 to save the modification of the SA 17 as a new SA 17 and having this associated with the user 138, the teacher would be presented with two options 140 concerning the IC 12. First, the user 40 could choose 145 to use the existing IC 12, contained within the SAE 14 that is associated with the SA 17 that was chosen for modification. In doing so the ACS 10 creates 149 a new SAE 14 and associates, 25 in FIG. 2, the new SA 17 with the newly designated SAE 14 and with the user 40. In this case the user 40 will now have two unique SA 17 each uniquely associated, 25 in FIG. 2, with a uniquely identified SAE 14. However each SAE 14 will contain the same IC 12. Second, the user 40 may choose 144 not to use the existing IC 12 in which case the ACS 10 will allow the user 40 to identify new IC 12 through a process of modifying the stored assessment event 147 that is further explained in FIG. 8. It should be noted that the until the user 40 has identified a new IC 12 and created a new SAE 14 within the modification process shown in FIG. 8, the ACS 10 will designate a SAE 14 that contains default information including default information related to an IC 12 and associate this SAE 14 that contains default information with the newly created SA 17.

If the user 40 selects the option 136 to save as a new assessment then all information related to the original stored assessment event that was being modified is unchanged.

If a user's choice for the save modifications option 132 is not to save, the user 40 may return 145 to the beginning of the modification process 129 or if the user 40 wishes to not continue with the modifications and not save what has been done 134, the ACS 10 will allow the user 40 to continue with other assessment activities or exit the entire assessment creation process 150.

Modify Stored Assessments—Currently Available

FIG. 6 indicates that a user may modify 113 an assessment that is currently being developed and that has been saved. As shown in FIG. 7 modifications to a current assessment 121 results in the ACS 10 allowing the user to move directly to the modification process 130. Once modification is permitted the process for modifications of the currently available assessment is the same as discussed above for assessments that were previously created but are not currently available.

Modifying Stored Assessment Events

Figure 8:
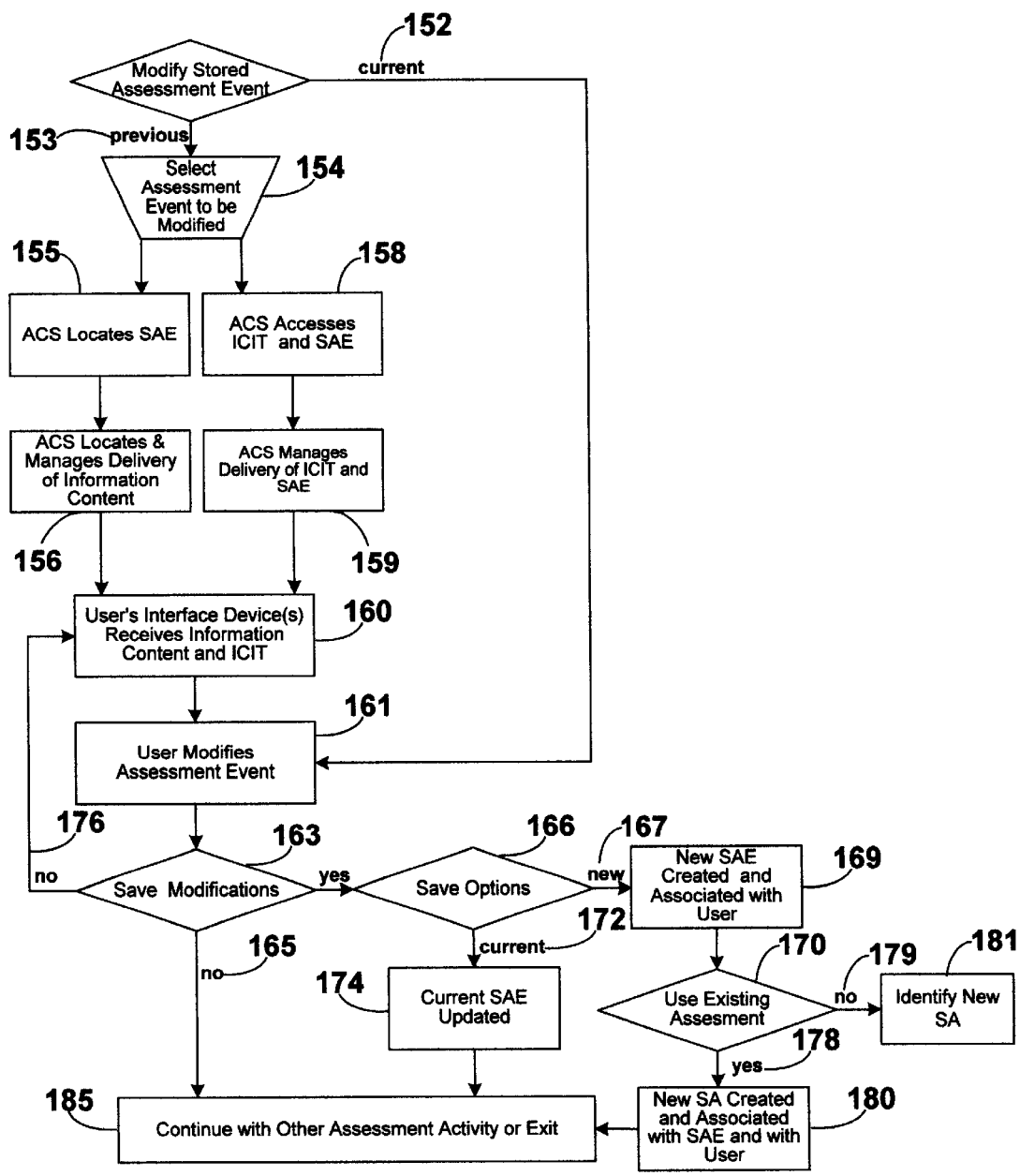
FIG. 8 shows a flow diagram representing the steps involving the process for modifying a stored assessment event.

FIG. 8 shows a flow diagram representing the steps carried out in the process of modifying a stored assessment event. Modification can take place on either a currently available assessment event 152 or on a previously developed but not currently available assessment event 153.

Modify Stored Assessment Event—Not Currently Available

Now referring to FIG. 5, in the case where a stored assessment event is not currently available, the user must maneuver to that part of the ACS 10, which contains the options 75 that include modifying existing information 77.

Now referring to FIG. 2 and FIG. 8, the ACS 10 allows the user 40 to make modifications to a SAE 14 using the ICIT 26. The modification may include changes, additions or deletion to information related to the IC 12 contained in the SAE 14 such as, but not limited to, altering descriptive information related to the existing IC 12 or selecting a different IC 12 item by entering new information related to the IC 12 including its electronic and/or communications channel(s) location(s).

Upon choosing the option to modify 153 a previous SAE 14, the user 40 must then choose 154 the SAE 14 that is to be modified. Once the user 40 has selected the SAE 14 to be modified the ACS 10 locates 155 the SAE 14 from that part of electronic storage area 33 associated 47 with the ACS 10 that is assigned to the user 40. Next the ACS 10 manages delivery 156 of the IC 12 that is identified within the selected SAE 14, to the user's ID 20. Once the IC 12 is either partially or fully retrieved, it is made available 160 to the user 40 through their ID 20 in a form that is managed by the ACS 10.

Concurrently while the ACS 10 is carrying out the functions related to managing the delivery of the IC 12 described above, it is also accessing 158 the electronic tools used for identifying the IC 12 and creating the SAE 14, namely the ICIT 26. In addition to accessing the ICIT 26, the ACS 10 also accesses the information within the selected SAE 14 from the storage area 33 associated 47 with the ACS 10 that is assigned to the user 40 and then manages delivery 159 of the ICIT 26, which contains the SAE 14, to the user's ID 20. The ICIT 26 and its contents are made available 160 to the user 40 through the ID 20 in a form that is managed by the ACS 10. For the present invention the form in which the IC 12 and the ICIT 26 are presented to the user's ID 40, is one that produces, for the user 40, the previously discussed continuous unified perceptual experience within the ID 20.

With the IC 12 and the ICIT 26, which contains the SAE 14, now available through the user's ID 20, the user 40 may begin to make modifications 161 to the SAE 14.

When the user 40 has finished modifications to the SAE 14 the ACS 10, through the ICIT 26, offers the user 40 the option 163 to save the modifications. If the user 40 chooses to save the modifications, the ACS 10 may offer two options 166 for saving the modifications. First, the modifications could replace certain information in the currently 172 selected SAE 14 in which case the modifications are saved in place of the existing information 174. By doing so all other identifiers and associations, such as the uniquely identifier assigned when the SAE 14 was originally created, remain unchanged.

Second, the user 40 may wish to save the modifications as a new stored assessment event 167 rather than replacing an existing SAE 14. In this case the information within the SAE 14 selected for modification remains unchanged. If the user 40 chooses to save as a new assessment event then the ACS 10 saves the information 169 as a new SAE 14 and associates this with the user 40. In this way the modification process can, in effect, be used as a new assessment creation process. For example, a teacher may wish to reuse elements of the same assessment (e.g., one or more of the same questions) that was previously developed and associated, 25 in FIG. 2, with the IC 12 that was chosen for modification (i.e., IC 12 associated with the chosen SAE 14). Upon choosing 167 to save the modification of the SAE 14 as a new stored assessment event the teacher would be presented with two options 170 concerning the SA 17. First the user 40 could choose 178 to use the existing assessment contained within the SA 17 associated with the SAE 14 that was chosen for modification. In doing so the ACS 10 creates 180 a new SA 17 and associates, 25 in FIG. 2, the new SAE 14 with the newly designated SA 17 and with the user 40. In this case the user 40 will now have two unique SAE 14s each uniquely associated, 25 in FIG. 2, with a uniquely identified SA 17. However, if the user has made no modifications to the SA 17 then each SA 17 will contain the same information. Second, the user 40 may choose 179 not to use the existing SA 17 in which case the ACS 10 will allow the user 40 to identify new SA 17 through a process of modifying the stored assessment 181 that is further explained in FIG. 7. It should be noted that the until the user 40 has developed a new SA 17 within the modification process shown in FIG. 7, the ACS 10 will create a new SA 17 that contains no assessment item and associate this SA 17 that has no assessment items with the newly designated SAE 14.

If a user's 40 choice for the save modifications option 163 is not to save, the user 40 may return 176 to the beginning of the modification process 161 or if the user 40 wishes to not continue with the modifications and not save what has been done 165, the ACS 10 will allow the user 40 to continue with other assessment activity or exit the entire assessment creation process 185.

Modifying Stored Assessment Event—Currently Available

FIG. 8 indicates that a user may modify 152 a stored assessment event that is currently available. As shown in FIG. 8 modifications to a current assessment 152 results in the ACS 10 allowing the user to move directly to the modification process 161. Once modification is permitted the process for modifying a currently available stored assessment event is the same as discussed above for stored assessments events that were previously created but were not currently available.

Visual Representation of Assessment Development Process

FIG. 9A through FIG. 9D present a visual representation of the assessment development process as it may appear within the continuous unified perceptual experience embodied in a single web browser that is sectioned into frames. The representation, while useful for effectively understanding the invention, is not limited to this embodiment since other methods may also be employed that do not use a web browser page for delivering the continuous unified perceptual experience. The representation within the web browser also assumes the possible presence of other items associated with the interface device that involve sensory experience and input. For instance, in this representation the user is creating the assessment using an interface device(s) connected to an electronic and/or communications channel(s). The user interacts with the interface device via inputs devices that include a keyboard and a computer mouse and in addition to visual stimuli may also receive stimuli from other sources such as via audio and motion.

This representation deals with the assessment development process after the user has located and identified the IC 12 and is permitted to develop an assessment using tools provided by the ADT 15. It is not intended to show the entire process for developing an assessment, rather, the intention of the representation is to isolate and describe certain aspects of the invention in order to convey basic understanding.

Figure 9A:
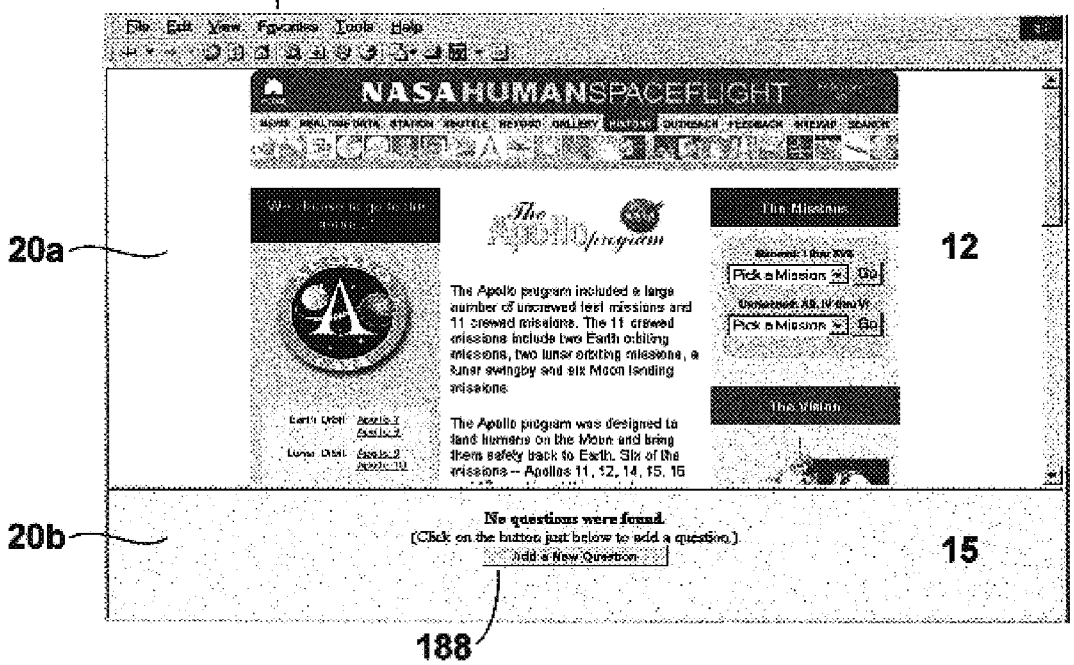
FIGS. 9A, 9B, 9C and 9D show additional representations of multiple components within a web browser.

FIG. 9A presents a single web browser 56 in which the IC 12 is displayed in component 20*a*, and the ADT 15 is displayed in component 20*b*. Both components, 20*a* and 20*b*, contain information drawn from separate electronic and/or communications channel(s) location(s). In this example component 20*a* containing the IC 12 represents electronic information drawn from one source (i.e., NASA web site) and component 20*b* containing the ADT 15 is drawn from the source containing the ACS 10. The ADT 15 guides the user through the assessment development process. For instance, in FIG. 9A the ADT 15 indicates how to add items to the assessment, in this case by clicking on the Add a New Question button 188 though other methods or graphic representations could be used.

Figure 9B:
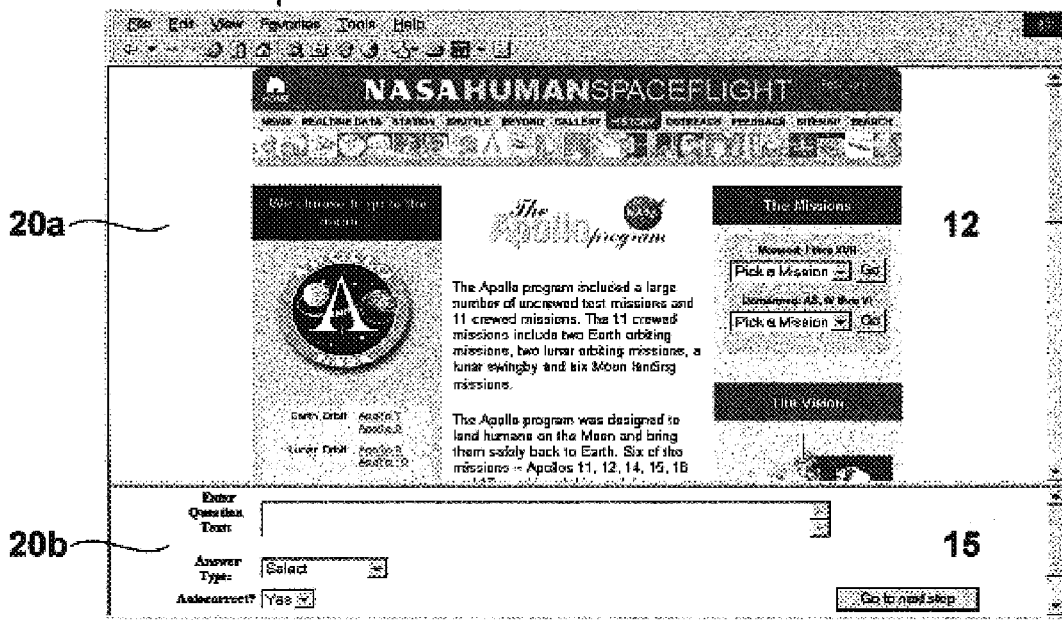

FIG. 9B shows the results of the user's decision to Add a New Question as the assessment control system delivers, via the ADT 15 in component 20*b*, the set of tools needed to develop an assessment item. For instance in this representation, the tools are to be used to develop test questions, which are related to the material appearing in the IC 12 contained in component 20a.

A comparison of FIG. 9A with FIG. 9B shows that the IC 12 in component 20a is the same in both FIG. 9A and 9B in which case the IC 12 is not altered when the user selects to Add a New Question and the assessment control system delivers, via the ADT 15 in component 20b, the set of tools needed to develop an assessment item. In this way the user can, if they choose, refer to the material in the IC 12 contained in component 20a while developing the assessment in the ADT 15 in component 20b. Working in the ADT 15 in component 20b does not affect the user's experience with the IC 12 in component 20a. The view of the IC 12 contained in component 20a is not blocked or disturbed by the user working in the ADT 15 in component 20b.

Figure 9C:
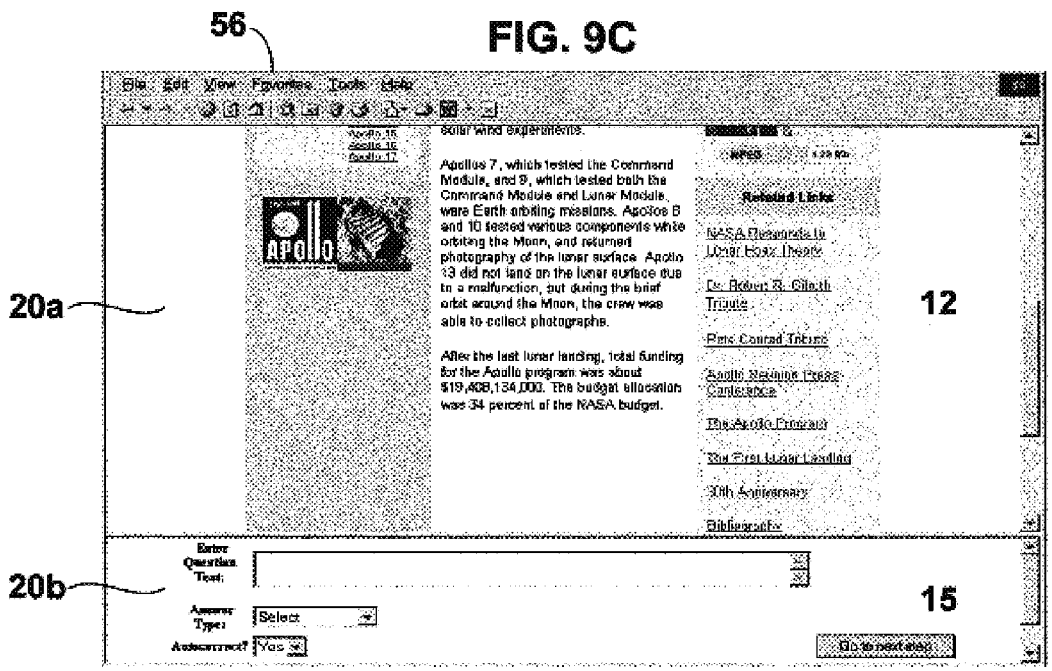

Continuing with the representation, FIG. 9C shows that the user can switch to the IC 12 in component 20a using an input mechanism and can work within this component. For example, as is shown in FIG. 9C, the user could scroll lower in the IC 12, however, doing so is within the user's continuous unified perceptual experience since it is part of the process of interacting with the web browser. Interacting with the IC 12 within component 20a does not affect the status of the experience the user is deriving from the ADT 15 in component 20b, which is unaffected by the user switching to the IC 12 in component 20a.

Figure 9D:
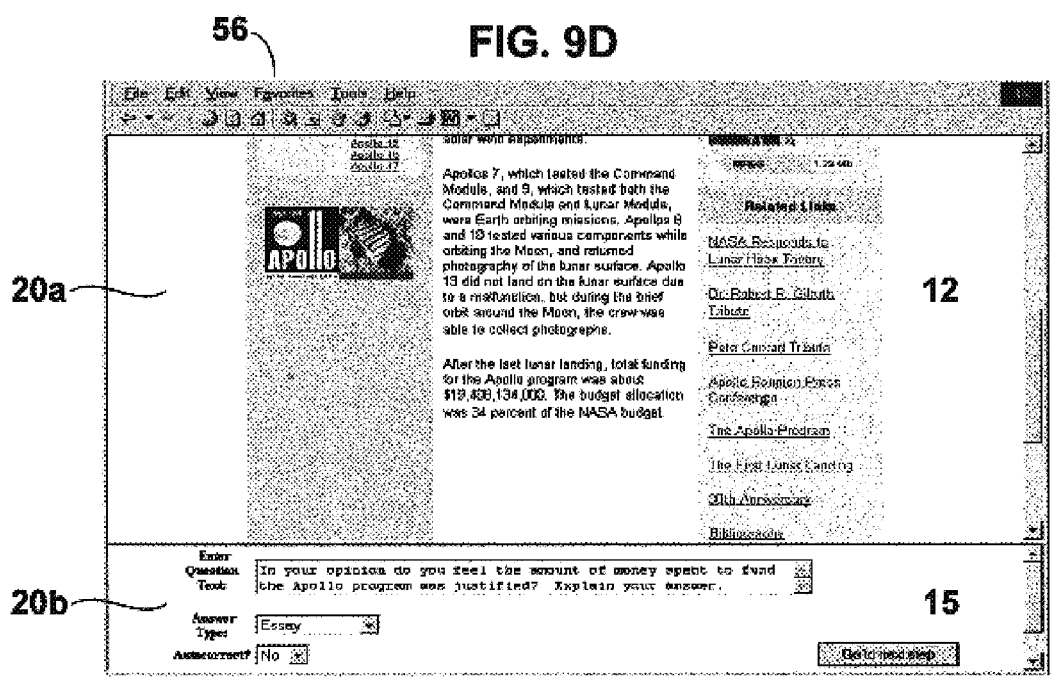

FIG. 9D shows that switching again to the ADT 15 within component 20b does not affect the user's continuous unified perceptual experience status since the experience the user is deriving from the IC 12 in component 20a is unaffected by the user switching to the ADT 15 within component 20b and the activity performed in the ADT 15 within component 20b is part of the process of interacting with the web browser. In this case the user has entered information within the ADT 15 contained in component 20b without affecting the IC 12 contained within component 20a.

Other Embodiments

It will be appreciated by those skilled in the art that the foregoing has set forth the presently preferred embodiment of the invention and an illustrative embodiment of the invention, but that numerous alternative embodiments are possible without departing from the novel teachings of the invention. For example, referring to FIG. 2, in another embodiment of the invention the information presented to the user 40 within their ID 20 may consist of more than two separate sources. In addition to the IC 12, and the ICIT 26 or the ADT 15, the ACS 10 may manage delivery of additional components that assist in the assessment creation and/or maintenance process. For instance, the IC 12, the ICIT 26 or the ADT 15 may each be divided into more than one component. Thus it is conceivable that the ID 20, as shown in FIG. 3A and FIG. 3B may consist of three or more components and the ACS 10 manages delivery of each in a manner that produces the previously discussed continuous unified perceptual experience.

Also, referring to FIG. 2 and FIG. 3A and FIG. 3B, an embodiment may exist in which the tools for identifying information related to information content, namely the ICIT 26, may be incorporated within the ADT 15. That is, both the ICIT 26 and the ADT 15 are simultaneously contained within the same component 20b in FIG. 3A or FIG. 3B.

Also, referring to FIG. 2, the current preferred embodiment shows the ACS 10 resides within equipment containing an information technology processor 32 that is accessible via an electronic and/or communications channel(s) 30. In another embodiment, the ACS 10 and its associated components such as, but not exclusively, the ICIT 26 and the ADT 15, may resides within equipment containing an information technology processor that is associated with the user 40. For example, the ACS 10 may reside on the user's computer. In this case access to the ACS 10 need not require access over an electronic and/or communications channel(s) 30. However, while in this embodiment access to the ACS 10 does not occur over an electronic and/or communications channel(s), access to an electronic and/or communications channel(s) may be required in order for the ACS 10 to carry out certain functions, most notably, managing the delivery of the IC 12. This would be the case unless all IC 12 rest on equipment or components that are associated with the equipment containing the ACS 10 and that do not require the use of an electronic and/or communications channel(s) to access.

Also, referring to FIG. 3A, an embodiment may exist in which the ICIT 26 is not presented in a manner consistent with a continuous unified perceptual experience. Rather the ICIT 26 may appear as a separate component within the user's ID 20. For instance, it may appear within a separate web browser. In this embodiment the user may need to switch between the different components in order to identify the IC 12. For example, a user may open a web browser to locate IC 12 and then once located switch to another web browser containing the ICIT 26 where the user can enter the information related to the IC 12 including its electronic and/or communications channel(s) location(s).

Also, an embodiment may exist in which a user may investigate or search for information content within one web browser or other application or means available through an interface device while the ACS 10 automatically tracks the electronic and/or communications channel(s) location(s) of the user's investigation or search. The tracking would occur within the ICIT 26 contained in another web browser or other application or means available through an interface device including in the embodiment shown in FIG. 3A. When the user has selected an IC 12, the user can switch to the ICIT 26 at which point certain information related to the IC 12, in particular its electronic and/or communications channel(s) location(s), will be registered by the ACS 10 within the ICIT 26. The user can then choose to enter additional information related to the IC 12 within the ICIT 26 and then save the information at which point the ACS 10 permits the user to develop the actual assessment.

Additional Applications

Another application of the current invention is to aid in the creation of other instructional items. In one application, the methods and processes described in this invention could also be used to develop materials that provide instruction. For instance, an instructional manual can be produced which is designed to provide assistance to another party. If the material is available via an electronic and/or communications channel(s) to the person developing the instructional material then the method and process of this invention can be utilized. In this circumstance, the assessment development tools would be replaced by instructional development tools, which include tools to develop instructional materials. As with the present invention involving assessment creation and maintenance, the information content for which the user is developing the instructional material, the instructional identification tools and the instructional development tools would have their delivery to the user's interface device managed by a control software system. The delivery to the user's interface device would be presented in a form that produces a continuous unified perceptual experience for the user. Also, as with the present invention, the information content that the user is using to develop the instructional material, and instructional identification tools and the instructional development tools would exist in separate electronic and/or communications channel(s) locations.

Additionally, the present invention could conceivably be utilized in other situations in which information content and developmental tools, each drawn from separate electronic and/or communications channel(s) location(s) and delivered in a manner that produces a continuous unified perceptual experience, offer benefits to the user. The chief benefit being that the developmental tools are presented in a manner that allows the user to utilize the tools while the information content is also present. Additional applications may include, but are not limited to: note taking, critical evaluation and review, collaborative project development and graphic design or illustration.

Conclusion, Ramification and Scope

The present invention provides a method utilizing electronic and/or communications channel(s) for allowing a user to create and maintain assessments while in the presence of certain information content in a way that provides a continuous unified perceptual experience. Such a method allows a user to create and manage assessments while experiencing the information content, which most likely is either directly or indirectly the subject or purpose for creating an assessment. In the absence of such a method those creating or maintaining assessments over electronic and/or communications channel(s) face problems as they move between information content and assessment creation tools. These disadvantage primarily occur due to the requirement that users make physical and/or mental adjustments or manipulations that at one point in time brings the information content within their sensory experience and another adjustment or manipulation to bring the assessment creation tools into their sensory experience. The act of bringing one of these items into the user's perceptual experience requires that the other item depart the user's perceptual experience either in part or in full.

For example, existing methods available to users who develop assessments in this way require the user to refer to information content in ways that include but are not limited: relying on memory, looking at printed material, looking at video or switching between different computer screens. These methods offer disadvantages that include but are not limited to: error in memory, transcribing mistakes, data input errors due to requirements for physical manipulations, out-of-date information, added costs, additional time and inconvenience.

The current invention addresses the disadvantages of existing methods for creating and maintaining assessments over an electronic and/or communications channel(s) by providing both the information content and the assessment creation tools within a continuous unified perceptual experience. Thus advantages of this invention include, but are not limited to: faster development time, less costly, lower error rates, and increased convenience. In addition, conceivably user's may be able to develop more effective assessments since the information content is readily available while the user is developing the assessment.

We claim:

1. A method for a user to create and maintain assessments comprising:

providing access through a user's interface device to an assessment control system;

requiring said user to identify information related to information content, including identifying the electronic and/or communications channel or channels location or locations of said information content, within information content identification tools located within said assessment control system;

designating a stored assessment event upon said user's saving of said information related to information content;

providing electronic storage of said stored assessment event;

associating said stored assessment event with said user;

managing the delivery to said user's interface device of multiple components, including a component containing said information content and a component containing assessment development tools located within said assessment control system;

providing a format in which said multiple components within said user's interface device is presented in a manner that produces a continuous unified perceptual experience and allows for user activity to occur in any single component of the said multiple components;

allowing the user to create and maintain said assessments within the said component containing the said assessment development tools while said information content remains within the said component containing said information content;

designating a stored assessment upon said user's saving of said assessment;

providing storage of said stored assessment;

associating the said stored assessment with the said user;

associating said stored assessment with the said stored assessment event;

permitting alteration, deletions or other maintenance of said stored assessment event and said stored assessment;

allowing for the creation of a new said stored assessment based on previous said stored assessment or previous said stored assessment event; and allowing for the creation of a new said stored assessment event based on previous said stored assessment or previous said stored assessment event.

2. The method of claim 1, wherein said electronics and/or communications channel or channels comprises information technology networks and sources including local area networks, Internet, Intranet, Extranets and local equipment; and communication networks and sources including digital and analog over-the-air transmissions, wireless transmissions, cable transmissions, and satellite transmissions.

3. The method of claim 1, wherein said interface device comprises all connected, interrelated or otherwise associated equipment or devices that allow said user to experience and/or interact with other available, authorized and/or otherwise accessible resources within said electronic and/or communications channel or channels.

4. The method of claim 1, wherein said assessment control system resides within components containing an information technology processor and associated components that is accessed via said electronic and/or communications channel or channels.

5. The method of claim 1, wherein said assessment control system resides within components containing an information technology processor and associated components that is local to said user and not accessed via said electronic and/or communications channel or channels.

6. The method of claim 1, wherein said information content comprises:
- information used in the process of educating, training, instructing, researching, informing and/or information gathering; and
- information available in a plurality of formats including text, graphics, video, animation, audio; over-the-air transmission; tactile materials, and olfactory materials.

7. The method of claim 1, wherein said information content comprises information located and accessible through said electronics and/or communications channel or channels.

8. The method of claim 1, wherein said information related to information content includes the direct or indirect said electronic or communications channel or channels location or locations of said information content.

9. The method of claim 1, wherein each said stored assessment event is uniquely identified so that each said stored assessment event is separate.

10. The method of claim 1, wherein said assessment development tools comprise electronics or communications items used to create a plurality of different assessment types and a plurality of items within each assessment type.

11. The method of claim 10, wherein said assessment types can be developed in a plurality of formats including text, graphics, video, animation, audio, over-the-air transmission, tactile materials, and olfactory materials.

12. The method of claim 1, wherein said assessment development tools allow for additional information including directions, information related to said information content and descriptions.

13. The method of claim 1, wherein said assessment comprises:
- materials used by one party to evaluate, test, gather, measure and/or gain insight into another party's understanding, knowledge, comprehension, progress, skill development, memory and/or other assessment criteria; and
- materials supplied by said user including that developed by said user, that not developed by said user, and that referenced or linked by said user.

14. The method of claim 1, wherein said assessment comprises materials supplied by the user that are accessible and deliverable via said electronics and/or communications channel or channels.

15. The method of claim 1, wherein each said stored assessment is uniquely identified so that each said stored assessment is separate.

16. The method of claim 1 wherein each single component within said multiple components contains information drawn from separate electronic and/or communications channel or channels location or locations.

17. The method of claim 1, wherein said delivery to said user's interface device of multiple components includes a component containing said information content identification tools and a component containing said information content.

18. The method of claim 17, wherein format of said multiple components within said user's interface device is presented in a manner that produces said continuous unified perceptual experience and allows for user activity to occur in any single component of the said multiple components.

19. The method of claim 1, wherein said multiple components exist concurrently within said user's interface device.

20. The method of claim 1, wherein said delivery to said user's interface device of multiple components can occur with each components being delivered via the same said electronics and/or communications channel or channels or with different components being delivered via different said electronics and/or communications channel or channels.

21. The method in claim 1, wherein said continuous unified perceptual experience comprises all sensory stimuli or outputs that are present within said user's interface device, either concurrently or in logical order, and producing a single or series of associated and undisturbed events.

22. The method of claim 1, wherein said user activity to occur in any single component comprises allowing activities to be performed within one said component while all other said components remain materially undisturbed.

23. The method of claim 1, wherein said user activity to occur in any single component comprises allowing activities to be performed within one said component while intentionally intending to alter the information in other components.

24. The method of claim 1, wherein said alteration, deletions or other maintenance of said stored assessment event and said stored assessment occurs within said continuous unified perceptual experience.

25. An assessment control system, comprising:
- assessment development tools for creating, adjusting, deleting and otherwise maintaining assessments;
- information content identification tools for identifying, adjusting, deleting and otherwise maintaining information related to information content including the electronic and/or communications channel or channels location or locations of said information content;
- means for designating a stored assessment event upon a user saving said information related to said information content;
- storage areas for retaining said stored assessment event;
- means for managing the delivery to a user's interface device of multiple components with the minimum consisting of a component containing said assessment development tools and a component containing said information content;
- means for formatting said delivery to said users interface device in which said multiple components within said user's interface device exist in a manner consistent with a continuous unified perceptual experience and allows for activities performed by said user to occur in any single component of the said multiple components;
- means for designating a stored assessment upon said user saving said assessment;
- storage areas for retaining said stored assessment;
- means for associating said stored assessment with said stored assessment event containing said information related to said information content;
- electronic tools for creating a new said stored assessment based on previous said stored assessment or previous said stored assessment event;
- electronic tools for creating a new said stored assessment event based on previous said stored assessment or previous said stored assessment event; and
- means for associating with said user said activities performed by said user within said assessment control system.

26. The system of claim 25, wherein said electronic and/or communications channel or channels comprise information technology networks and sources including local area networks, Internet, Intranet, Extranets and local equipment; and communication networks and sources including digital and analog over-the-air transmissions, wireless transmissions, cable transmissions, and satellite transmissions.

27. The system in claim 25, wherein said assessment control system resides within components containing an information technology processor and associated components.

28. The system in claim 27, wherein said components containing an information technology processor and associated components are accessed via said electronic and/or communications channel or channels.

29. The system in claim 27, wherein said components containing an information technology processor and associated components are local to said user and not accessed via said electronic and/or communications channel or channels.

30. The system in claim 25, wherein said assessment development tools allow for:

creating a plurality of assessment item types and a plurality of items within each said assessment item types; and the inclusion of additional information including directions, information related to said information content and descriptions.

31. The system in claim 30 wherein said assessment item types can be developed in a plurality of formats including text, graphics, video, animation, audio; over-the-air transmission; tactile materials, and olfactory materials.

32. The system in claim 25, wherein said information content comprises:

information used in the process of educating, training, instructing, researching, informing and/or information gathering; and information in a plurality of formats including text, graphics, video, animation, audio, over-the-air transmission, tactile materials, and olfactory materials.

33. The system in claim 25, wherein said information content comprises information located and accessible via said electronics and/or communications channel or channels.

34. The system of claim 25, wherein said information related to information content including the electronic and/or communications channel or channels location or locations of said information content consists of either the direct or the indirect location or locations of said information content.

35. The system of claim 25, wherein said interface device comprises all connected, interrelated or otherwise associated equipment or devices that allow said user to experience and/or interact with other available, authorized and/or otherwise accessible resources within said electronic and/or communication channel or channels.

36. The system in claim 25, wherein said delivery to a user's interface device of multiple components occurs via said electronic and/or communications channel or channels.

37. The system in claim 25, wherein said delivery to a user's interface device of multiple components can occur with each component being delivered via the same channel or with different components being delivered via different channels.

38. The system of claim 25, wherein said delivery to a user's interface device of multiple components includes a component containing said information content identification tools and a component containing said information content.

39. The method of claim 38, wherein said delivery to a user's interface device of multiple components is presented in a manner that produces said continuous unified perceptual experience and allows for user activity to occur in any single component of the said multiple components.

40. The system of claim 25, wherein said continuous unified perceptual experience comprises all sensory stimuli or outputs that are present within said user's interface device, either concurrently or in logical order, and producing a single or series of associated and undisturbed events.

41. The system in claim 25, wherein said stored assessment is also made available as an unassociated assessment which can be included within a pool of assessment items that then can be selectively chosen to be included in another assessment or can be made available to other users to build assessments.

* * * * *